United States Patent
Nicol

(10) Patent No.: US 10,437,728 B2
(45) Date of Patent: *Oct. 8, 2019

(54) BRANCHLESS INSTRUCTION PAGING IN RECONFIGURABLE FABRIC

(71) Applicant: Wave Computing, Inc., Campbell, CA (US)

(72) Inventor: Christopher John Nicol, Campbell, CA (US)

(73) Assignee: Wave Computing, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,107

(22) Filed: Sep. 10, 2018

(65) Prior Publication Data

US 2019/0004962 A1    Jan. 3, 2019

Related U.S. Application Data

(63) Continuation-in-part of application No. 15/048,983, filed on Feb. 19, 2016, now Pat. No. 10,073,773.

(Continued)

(51) Int. Cl.
*G06F 12/00* (2006.01)
*G06F 12/0875* (2016.01)
(Continued)

(52) U.S. Cl.
CPC ............ *G06F 12/0875* (2013.01); *G06F 3/06* (2013.01); *G06F 9/3816* (2013.01); *G06F 12/08* (2013.01);
(Continued)

(58) Field of Classification Search
CPC ................................................. G06F 12/0875
See application file for complete search history.

(56) References Cited

U.S. PATENT DOCUMENTS 6,134,605 A    10/2000 Hudson et al.
6,363,470 B1    3/2002 Laurenti et al.
(Continued)

FOREIGN PATENT DOCUMENTS

JP           2005165961 A     12/2003
WO      WO2009131569 A1     10/2009
WO      WO-2009131569 A1 *  10/2009   ......... G06F 17/5054

OTHER PUBLICATIONS

International Search Report dated Feb. 6, 2015 for PCT/US2014/063591.

*Primary Examiner* — Baboucarr Faal
(74) *Attorney, Agent, or Firm* — Adams Intellex, PLC

(57) ABSTRACT

Circular buffers containing instructions that enable the execution of operations on logical elements are described where data in the circular buffers is swapped to storage. The instructions comprise a branchless instruction set. Data stored in circular buffers is paged in and out to a second level memory. State information for each logical element is also saved and restored using paging memory. Instructions are provided to logical elements, such as processing elements, via circular buffers. The instructions enable a group of processing elements to perform operations implementing a desired functionality. That functionality is changed by updating the circular buffers with new instructions that are transferred from paging memory. The previous instructions can be saved off in paging memory before the new instructions are copied over to the circular buffers. This enables the hardware to be rapidly reconfigured amongst multiple functions.

22 Claims, 13 Drawing Sheets

Related U.S. Application Data

(60) Provisional application No. 62/694,984, filed on Jul. 7, 2018, provisional application No. 62/692,993, filed on Jul. 2, 2018, provisional application No. 62/679,046, filed on Jun. 1, 2018, provisional application No. 62/679,172, filed on Jun. 1, 2018, provisional application No. 62/650,758, filed on Mar. 30, 2018, provisional application No. 62/650,425, filed on Mar. 30, 2018, provisional application No. 62/637,614, filed on Mar. 2, 2018, provisional application No. 62/636,309, filed on Feb. 28, 2018, provisional application No. 62/611,588, filed on Dec. 29, 2017, provisional application No. 62/611,600, filed on Dec. 29, 2017, provisional application No. 62/594,563, filed on Dec. 5, 2017, provisional application No. 62/594,582, filed on Dec. 5, 2017, provisional application No. 62/579,616, filed on Oct. 31, 2017, provisional application No. 62/577,902, filed on Oct. 27, 2017, provisional application No. 62/119,110, filed on Feb. 21, 2015.

(51) Int. Cl.
| | | |
|---|---|---|
| *G06F 9/38* | (2018.01) | |
| *G06F 15/78* | (2006.01) | |
| *G06F 3/06* | (2006.01) | |
| *G06F 12/08* | (2016.01) | |
| *G06F 13/28* | (2006.01) | |
| *G06N 3/04* | (2006.01) | |
| *G06N 3/063* | (2006.01) | |
| *G06F 9/50* | (2006.01) | |

(52) U.S. Cl.
CPC .......... *G06F 13/28* (2013.01); *G06F 15/7867* (2013.01); *G06F 9/50* (2013.01); *G06F 2212/1008* (2013.01); *G06F 2212/1016* (2013.01); *G06N 3/0454* (2013.01); *G06N 3/063* (2013.01)

(56) References Cited

U.S. PATENT DOCUMENTS

| | | |
|---|---|---|
| 8,314,636 B2 | 11/2012 | Hutton et al. |
| 8,341,469 B2 | 12/2012 | Miyama et al. |
| 2007/0133399 A1 | 6/2007 | Gangwal |
| 2009/0089605 A1 | 4/2009 | Westwick et al. |
| 2010/0013517 A1 | 1/2010 | Manohar et al. |
| 2010/0281448 A1 | 11/2010 | He |
| 2011/0199117 A1 | 8/2011 | Hutchings et al. |
| 2012/0119781 A1 | 5/2012 | Manohar et al. |
| 2012/0235839 A1 | 9/2012 | Mazumdar et al. |
| 2012/0319730 A1 | 12/2012 | Fitton et al. |
| 2013/0009666 A1 | 1/2013 | Hutton et al. |
| 2013/0009667 A1 | 1/2013 | Calhoun et al. |
| 2013/0043902 A1 | 2/2013 | Rahim et al. |
| 2014/0075144 A1 | 3/2014 | Sanders et al. |
| 2015/0169360 A1* | 6/2015 | Busaba .................. G06F 9/467 711/147 |

\* cited by examiner

BRANCHLESS INSTRUCTION PAGING IN RECONFIGURABLE FABRIC

RELATED APPLICATIONS

This application claims the benefit of U.S. provisional patent applications "Tensor Manipulation Within a Neural Network" Ser. No. 62/577,902, filed Oct. 27, 2017, "Tensor Radix Point Calculation in a Neural Network" Ser. No. 62/579,616, filed Oct. 31, 2017, "Pipelined Tensor Manipulation Within a Reconfigurable Fabric" Ser. No. 62/594,563, filed Dec. 5, 2017, "Tensor Manipulation Within a Reconfigurable Fabric Using Pointers" Ser. No. 62/594,582, filed Dec. 5, 2017, "Dynamic Reconfiguration With Partially Resident Agents" Ser. No. 62/611,588, filed Dec. 29, 2017, "Multithreaded Dataflow Processing Within a Reconfigurable Fabric" Ser. No. 62/611,600, filed Dec. 29, 2017, "Matrix Computation Within a Reconfigurable Processor Fabric" Ser. No. 62/636,309, filed Feb. 28, 2018, "Dynamic Reconfiguration Using Data Transfer Control" Ser. No. 62/637,614, filed Mar. 2, 2018, "Data Flow Graph Computation for Machine Learning" Ser. No. 62/650,758, filed Mar. 30, 2018, "Checkpointing Data Flow Graph Computation for Machine Learning" Ser. No. 62/650,425, filed Mar. 30, 2018, "Data Flow Graph Node Update for Machine Learning" Ser. No. 62/679,046, filed Jun. 1, 2018, "Dataflow Graph Node Parallel Update for Machine Learning" Ser. No. 62/679,172, filed Jun. 1, 2018, "Neural Network Output Layer for Machine Learning" Ser. No. 62/692,993, filed Jul. 2, 2018, and "Data Flow Graph Computation Using Exceptions" Ser. No. 62/694,984, filed Jul. 7, 2018.

This application is also a continuation-in-part of U.S. patent application "Instruction Paging in Reconfigurable Fabric" Ser. No. 15/048,983, filed Feb. 19, 2016, which claims the benefit of U.S. provisional patent application "Instruction Paging in Reconfigurable Fabric" Ser. No. 62/119,110, filed Feb. 21, 2015.

Each of the foregoing applications is hereby incorporated by reference in its entirety.

FIELD OF ART

This application relates generally to logic circuitry and more particularly to instruction paging for a reconfigurable fabric.

BACKGROUND

The demand for increased computing power to implement newer electronic designs for a variety of applications such as computing, networking, communications, consumer electronics, and data encryption, to name a few, is continuous and crucial in today's modern computing world. In addition to processing speed, configuration flexibility is a key attribute that is desired in modern computing systems. Multiple core processor designs enable two or more cores to run simultaneously, and the combined throughput of the multiple cores can exceed the processing power of a single-core processor. The multiple core capacity allows electronic devices to increase in capability, in accordance with Moore's Law, without hitting the boundaries that would be encountered when implementing similar processing power using a single core processor.

In some architectures, multiple cores can work together to perform a particular task. In this case, the cores communicate with each other, exchange data, and combine data to produce intermediate and/or final outputs. Each core can have a variety of registers to support program execution and storage of intermediate data. Additionally, registers such as stack pointers, return addresses, and exception data can enable execution of complex routines and support debugging of computer programs running on the multiple cores. Further, arithmetic units can provide mathematical functionality, such as addition, subtraction, multiplication, and division.

Reconfigurability is an important attribute in many processing applications. Reconfigurable devices have proven extremely efficient for certain types of processing tasks. The key to the cost and performance advantages of reconfigurable devices in certain roles is that conventional processors are often limited by instruction bandwidth and execution restrictions. In contrast to conventional processors, reconfigurable logic enables program parallelism, allowing for multiple simultaneous computation operations for the same program. Often, the high-density properties of reconfigurable devices come at the expense of the high-diversity property that is inherent in microprocessors. Microprocessors have evolved to a highly optimized configuration that can provide cost/performance advantages over reconfigurable arrays for certain tasks with high functional diversity. However, there are many tasks for which a conventional microprocessor may not be the best design choice. Other conventional computing techniques involve the use of application specific integrated circuits (ASICs), circuits designed from the ground up with a specific application or implementation in mind, to achieve high performance at the cost of extremely inflexible hardware design.

The emergence of reconfigurable computing has created a capability for both flexibility and performance of computer systems. Reconfigurable computing combines the high speed of application specific integrated circuits with the flexibility of programmable processors. Reconfigurable processors have further increased the possibility for improvements in processing power and system redundancy. In many disciplines, multiple core reconfigurable processors are continuing to play an important role in the development of new systems.

SUMMARY

Disclosed embodiments provide for branchless instruction paging for processing. Multiple logical elements, such as processing elements, can be configured into groups. Each processing element is fed instructions by a circular buffer. The instructions enable the group of processing elements to perform operations to implement a desired functionality. When changing the functionality is desired, the circular buffers are updated with new instructions that are transferred from paging memory. The previous instructions can be saved off in paging memory before the new instructions are copied over to the circular buffers. The saving off of previous instructions allows previous functionality to be quickly restored when desired, thus enabling the hardware to be quickly reconfigured amongst multiple functions and providing increased flexibility.

A processor-implemented method for computation is disclosed comprising: paging data stored in a plurality of circular buffers, wherein the plurality of circular buffers controls one or more logical elements of a reconfigurable fabric, and where the paging comprises: copying data from a first storage memory into the plurality of circular buffers where: each of the plurality of circular buffers is coupled to at least one of the one or more logical elements; the data provides instructions for the one or more logical elements;

as the circular buffers rotate, the instructions that are provided to the one or more logical elements change; and the instructions comprise a branchless instruction set. In embodiments, instructions from a configuration ROM are used to operate the reconfigurable fabric while the paging is accomplished. In embodiments, the paging further comprises copying the data stored in the plurality of circular buffers into a second storage memory. Some embodiments further comprise storing state information in the second storage memory. In embodiments, the copying of the data stored in the plurality of circular buffers into a second storage memory occurs before the copying of the data from a first storage memory into the plurality of circular buffers. In embodiments, the paging includes copying the data stored in the plurality of circular buffers into a second storage memory. The paging can occur while other circular buffers continue to rotate.

In embodiments, an apparatus for computation comprises: a plurality of circular buffers where the plurality of circular buffers contains instructions for logical elements that are coupled to the plurality of circular buffers, and where the plurality of circular buffers contains a first copy of instructions comprising a branchless instruction set; a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers. In embodiments, the first copy of instructions is swappable to a swapping memory. Some embodiments further comprise a further storage memory for a third copy of instructions for the plurality of circular buffers where the further storage memory is coupled to the plurality of circular buffers; and a further set of switches and connections for transferring contents of the further storage memory to the plurality of circular buffers. In embodiments, the first copy of instructions is copied to a swapping memory before the third copy of instructions is moved into the plurality of circular buffers.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
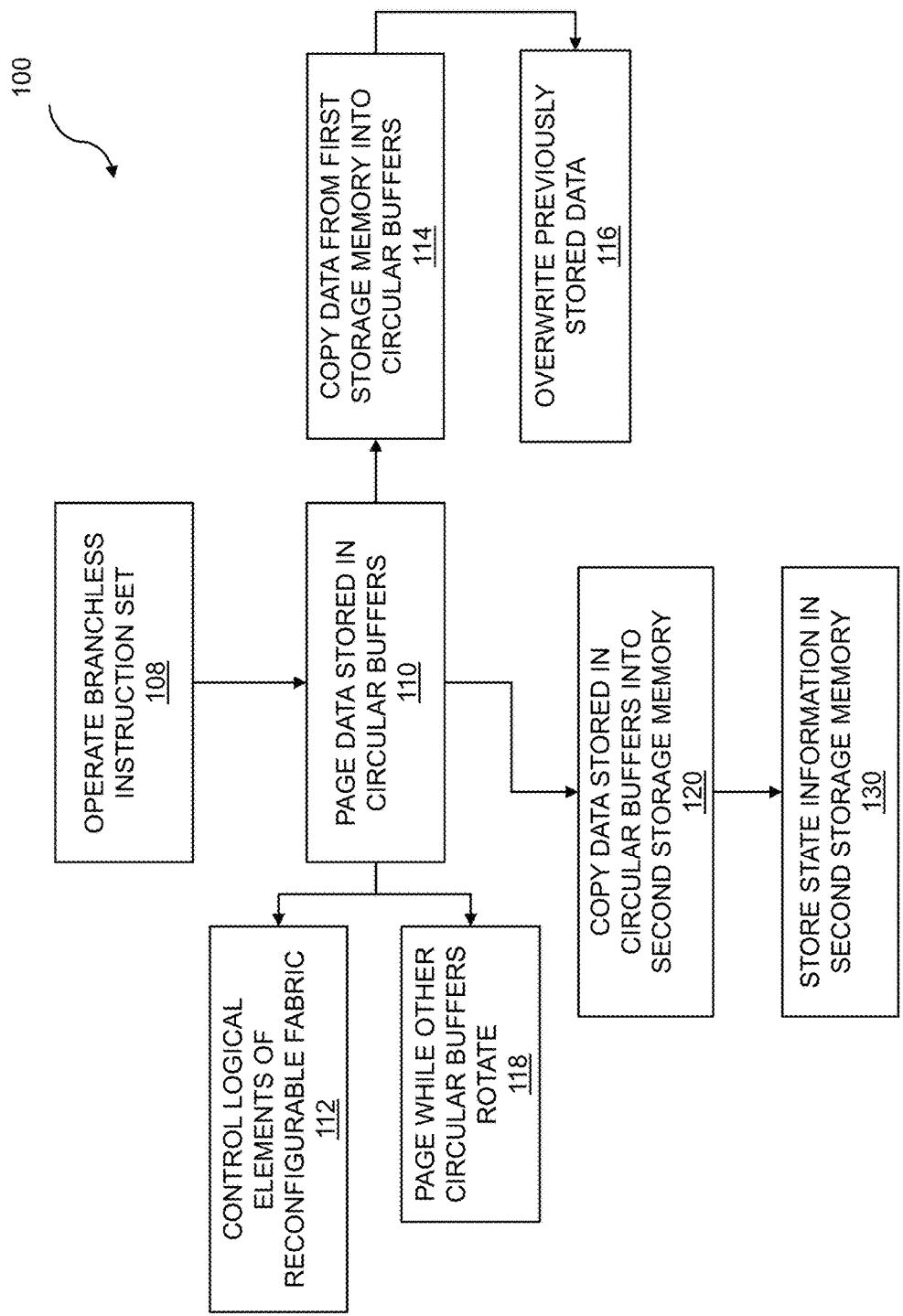
FIG. 1 is a flow diagram for instruction paging.

The staggering pace of change in electronic circuit design techniques and system development continues to drive improvements in hardware designs and associated capabilities. The improvement derives from a wide range of design criteria including system scale, parts availability, time to design, and cost. Design techniques such as those based on microprocessors and/or other semiconductor chips are readily available. These same parts may provide far more capabilities than are required for certain simple applications. Other tasks, though, continuously demand faster and more complex semiconductor implementations. Some custom designs can be tailored to a specific application and can provide the exact capabilities required by that application. Such custom designs are implemented at high cost and cannot be later changed to add new features, fix bugs, or improve performance without extensive and costly redesign. In an attempt to reduce the cost of custom designs, the semiconductor chips can be based on design libraries of circuits, modules, cores, and so on.

Application specific integrated circuits (ASICs) can be designed and built from circuits, modules, and cores. The digital systems that are based on ASICs can be powerful and efficient in certain applications (e.g. their original designs), but can be costly to build and to repair in functionality. That is, the functionality of the ASICs can be limited solely to their original designs. Another custom circuit design technique can be based on Field Programmable Gate Arrays (FPGAs). FPGAs are based on a common circuit designs (e.g. a NAND structure, ROM, registers, etc.) that can be tailored or "customized" by a customer after manufacture of the chip. The FPGAs can be more versatile than ASICs in that they can be adapted to new tasks after circuit fabrication. At the same time, the FPGAs can be costly and yet be slower than the ASICs that perform the same function. In addition, the FPGAs can be time consuming to reconfigure.

A new technique for reconfigurable circuits employs circular buffers containing instructions that direct computation. Digital computation can be performed by circuits that are configured based on such instructions. A first set of instructions can be provided to the circuits and can be used to control the operations of the circuits, communications between and among multiple circuits, etc. To change the digital computation that can be performed by the circuits, a second set of instructions can be provided to the circuits. The first set of instructions can be grouped and the second set of instructions can be grouped to form one or more pages of instructions. A page can be loaded into a circular buffer which can be used to control a set of operations. The instructions on a page in a circular buffer can continue to be executed until a different page is loaded into the circular buffer. Loading a different page into a given circular buffer in effect changes or reprograms the circuit upon which the instructions in the circular buffer operate. The result of loading different pages into the circular buffer reprograms the digital computational circuit "on the fly" thereby permitting the circuit to be reconfigured as and when needed.

A given computational circuit can include multiple circular buffers and multiple circuits or logical elements. The circuits can include computational elements, communications paths, storage, and other circuit elements. Each circular buffer can be loaded with a page of instructions which configures the digital circuit operated upon by the instructions in the circular buffer. When and if a digital circuit is required to be reconfigured, a different page of instructions can be loaded into the circular buffer and can overwrite the previous page of instructions that was in the circular buffer. A given circular buffer and the circuit element which the circular buffer controls can operate independently from other circular buffers and their concomitant circuit elements. The circular buffers and circuit elements can operate in an asynchronous manner. That is, the circular buffers and circuit elements can be self-clocked, self-timed, etc., and can require no additional clock signal. Further, swapping out one page of instructions for another page of instructions does not require retiming the circuit elements. The circular buffers and circuit elements can operate as hum circuits, where a hum circuit is an asynchronous circuit which operates at its own resonant or "hum" frequency.

Disclosed herein are processor-implemented techniques for computation. Digital computation increasingly influences our daily lives. Digital computations enable many life activities, whether playing games, searching for bargains on the latest fashions, researching medical studies, operating equipment and vehicles, communicating with others, or tracking the latest stories on political office holders and office seekers. The digital computation underlies all of these and other activities by supporting artificial intelligence, enabling search operations, controlling and monitoring life support functions, implementing communications protocols, etc. Embodiments disclosed herein provide for paging of instructions for processors. The paging provides for fast reconfiguration of hardware and allows the hardware, which may contain multiple logical elements, to be quickly reconfigured for different tasks. Multiple logical elements (storage, processing, switching) working in a coordinated manner can provide increased computational throughput and can result in benefits superior to that of customized hardware (e.g. ASICs) performance and typical programmable hardware (e.g. FPGAs) flexibility.

FIG. 1 is a flow diagram for paging of instructions. The flow 100 includes operating a branchless instruction set 108. An instruction set that includes branches allows for programming conventions such as conditional jumps, do loops and other conditional loops, if then and if then else statements, and so on. An instruction set with branches provides flexibility, but can add runtime complexity and explode instruction count when compiled. A branchless instruction set requires careful functional implementation, but it allows for fast and efficient execution and compiled code size. A branchless instruction set is particularly advantageous for controlling the operation of a reconfigurable fabric using rotating circular buffers. Thus in embodiments, the branchless instruction set excludes if statements. In embodiments, the branchless instruction set precludes programming loops. And in embodiments, the branchless instruction set excludes conditional jumps.

The flow 100 includes paging data stored in a plurality of circular buffers 110. The data stored in the circular buffers can comprise instructions from a branchless instruction set. The data can be used to control logical elements of a reconfigurable fabric 112. The paging operations can include copying data to/from the plurality of circular buffers into one or more regions of memory. In embodiments, the memory includes, but is not limited to, SRAM and/or DRAM. The paging comprises copying data from a first storage memory into the plurality of circular buffers 114. The copying overwrites previously stored data 116 in the circular buffers. The data from the first storage memory can include instruction information. The instructions can include, but are not limited to, logical AND, OR, NOR, and XOR instructions. Furthermore, other instructions such as mathematical operations, ADD, DIV, SUB, MULT, and various shift and jump instructions can also be included. The data from the first storage memory can include state information. The state information can include, but is not limited to, program counter values, stack pointer values, and values of other registers used for storage of intermediate results.

In embodiments, the plurality of circular buffers is coupled to logical elements where the plurality of circular buffers controls the logical elements. The logical elements can comprise one or more of switching elements, processing elements, or storage elements. Thus, the circular buffers contain data that causes the logical elements to perform operations. The data provides instructions for the logical elements. As the circular buffers rotate, the instructions that are delivered to the logical elements change. The circular buffers rotate, either by moving within a predetermined memory region, or by moving a program counter to reference a new data location within a circular buffer, where the program counter indicates which piece of data (instruction) is fed to a given logical element (e.g. processor) at any instance in time. Multiple sets of circular buffers and corresponding logical elements can be present. As the circular buffers rotate, the instructions fed to the logical elements change. The instructions that change and that are delivered to the logical elements can provide for the execution of a first sequence of operations by the logical elements.

In embodiments, data stored in the circular buffers is copied into a second storage memory 120. Optionally, state information can also be stored in the second storage memory 130. The state information can include, but is not limited to, program counter values, stack pointer values, and values of other registers used for the storage of intermediate results.

At an appropriate time, a second set of instructions can be copied from the first storage memory to the circular buffers. Thus, the data from the first storage memory provides a second set of instructions to the logical elements. In turn, the second set of instructions can provide a second sequence of operations to be executed by the logical elements. The first sequence of operations and the second sequence of operations can differ. In this way, the plurality of logical elements can be reprogrammed for new functionality based on the copying of the second set of instructions into the circular buffers and the subsequent rotating of the circular buffers while they contain the second set of instructions.

In embodiments, multiple sets of circular buffers are present. The paging can occur while circular buffers other than the plurality of circular buffers continue to rotate 118. Thus, the other circular buffers can continue to rotate and feed instructions to logical elements while the set of circular buffers undergoing a paging operation is stabilized to prepare for restoring, reprogramming, or copying of the circular buffer information, which can include instructions and/or state information. In embodiments, the paging could be referred to as hot swapping of instructions into a massively parallel processing computer.

Figure 2:
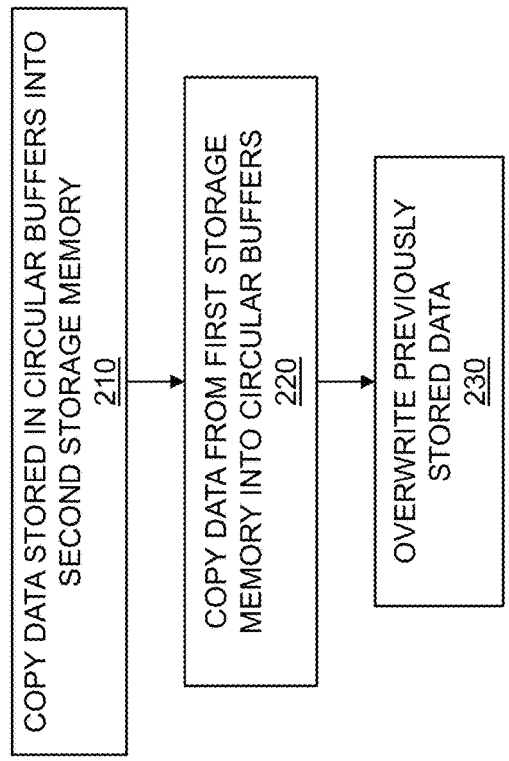
FIG. 2 is a flow diagram for data copying.

FIG. 2 is a flow diagram 200 for data copying. As before, it should be noted that the present disclosure includes embodiments for paging memory, where the paging includes instruction paging. The paging can further comprise copying data stored in a plurality of circular buffers into a second storage memory 210. The flow 200 can further comprise storing state information in the second storage memory. The state information can include, but is not limited to, program counter values, stack pointer values, and values of other registers used for storage of intermediate results. The copying of the data stored in the plurality of circular buffers into a second storage memory can occur before the copying of the data from a first storage memory into the plurality of circular buffers 220. In such a manner, the contents and/or state information are preserved so that they can be restored at a later time. Thus, the logical elements can be programmed for different functionalities, and can operate across the different functionalities in a time-shared manner by switching out sets of instructions and/or state information using multiple pages simultaneously. Additionally, after the data originally stored in the circular buffers has been copied into the second storage memory, the copying of the data from the first storage memory into the plurality of circular buffers can cause data previously stored in the plurality of circular buffers to be overwritten 230.

In embodiments, the first storage memory comprises the second storage memory. That is, the first storage memory and the second storage memory can be implemented using a single region of memory implemented as a dual port memory. In some embodiments, the first storage memory and the second storage memory are substantially similar, but in other embodiments, the sizes of the first storage memory and second storage memory differ. The size of the storage memory can depend on a variety of factors, including, but not limited to, the number and size of the circular buffers, the instruction size, and the size of the state information. In some embodiments, paging can provide a larger overall processing function by swapping out some operations for other operations.

Figure 3:
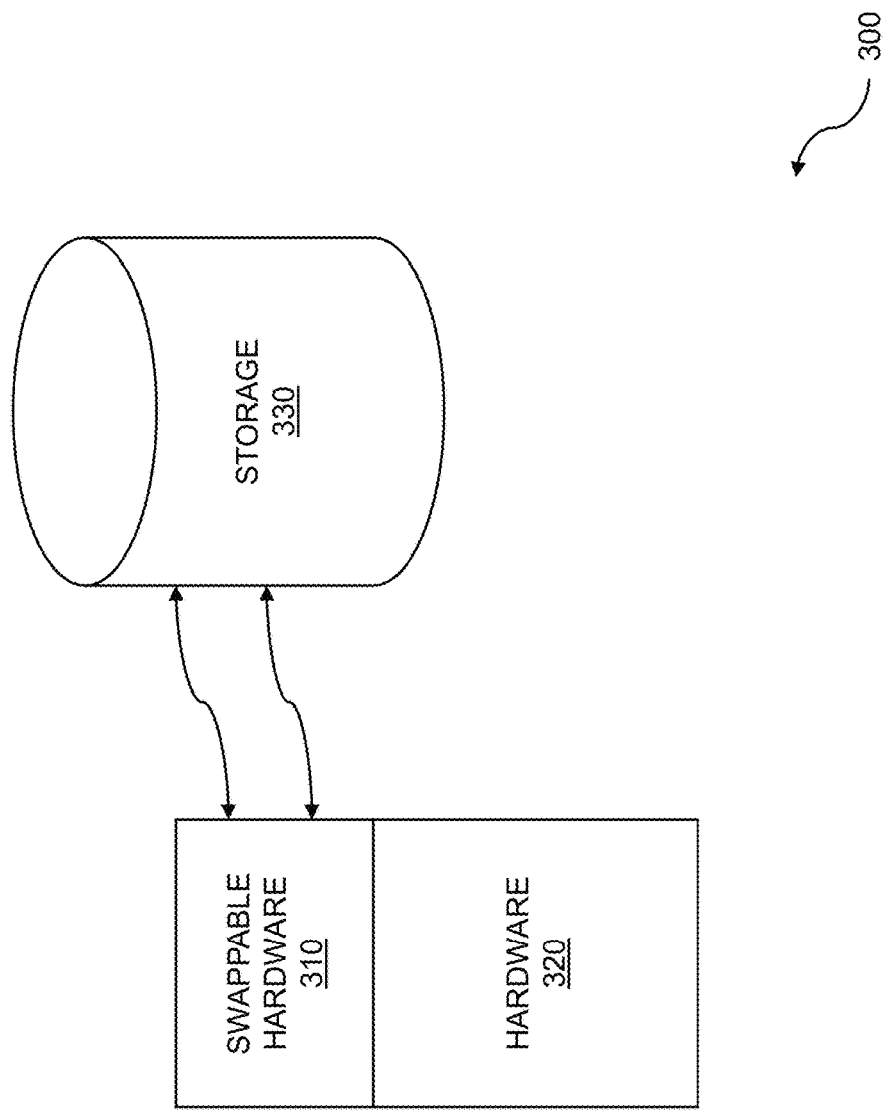
FIG. 3 is an apparatus illustrating instruction paging.

FIG. 3 is an apparatus 300 illustrating instruction paging. Swappable reconfigurable hardware 310 comprises one or more logical elements that are configured and disposed to receive data from a corresponding circular buffer. The logical elements and circular buffers can be arranged in groups. One group can have its corresponding circular buffers updated with new data from the storage 330 while other groups continue to rotate, providing instructions to their corresponding logical elements. The storage 330 can include static RAM (SRAM), dynamic RAM (DRAM), or another suitable memory technology. The swapping memory can comprise the storage memory. The storage memory can include state information for the plurality of circular buffers. The swapping memory can further contain state information that is copied from circuitry associated with the plurality of circular buffers.

Other hardware 320 besides the swappable reconfigurable hardware 310 can include one or more processors and/or controllers that implement paging control functionality. The hardware 320 can comprise elements that are configured and disposed to control the mode of operation of the circular buffers and/or the logical elements. The circular buffers can operate in a normal mode, where the circular buffers rotate and provide instructions to logical elements to implement a desired functionality. The circular buffers can also be placed in a stabilized mode. The stabilized mode can be an offline mode in which the circular buffers stop rotating and/or the logical elements remain in a paused or sleep state. Once the circular buffers are in a stabilized mode, the contents of the circular buffers can be safely changed by copying new instructions into the circular buffers from the storage 330 into the circular buffers corresponding to the swappable hardware 310. The non-swappable hardware 320 can initiate transfer of the existing instructions from the circular buffers corresponding to the swappable hardware to the storage 330 before loading new instructions into the circular buffers. The non-swappable hardware 320 can control how frequently the paging operations occur, and on which group(s) the paging operations occur.

For example, consider a case where the swappable hardware 310 comprises three groups of circular buffers and logical elements, referred to as groups A, B, and C. The hardware 320 can operate in a round-robin manner, where at first the circular buffers of group A are placed in a stabilized mode, while elements B and C continue to execute as normal and the logical elements of group B and C continue to receive instructions from their respective circular buffers. Then, the circular buffers of group A are updated from the storage 330, and the hardware 320 places group A into normal mode, thus beginning logical element execution of the new instructions. The process is then repeated on group B, on group C, and then performed on group A again, etc. In some embodiments, more than one group is simultaneously placed into stabilized mode for paging. For example, in some embodiments, the hardware 320 implements a paging control functionality that updates the instructions of groups A and B at the same time, while allowing group C to continue in normal mode. In some embodiments, the hardware 320 operates in an event-driven mode, where the paging occurs based on an event. The event can be an interrupt based on an internal or external condition. For example, an interrupt based on an input/output (IO) signal can trigger a paging operation. In other embodiments, the paging is triggered upon encountering a program exception. In such a case, if a group of logical elements encounters a program exception (e.g. invalid instruction, divide by zero, etc.), then the circular buffers can be loaded with a new set of instructions from the storage 330 as part of a recovery procedure.

Figure 4:
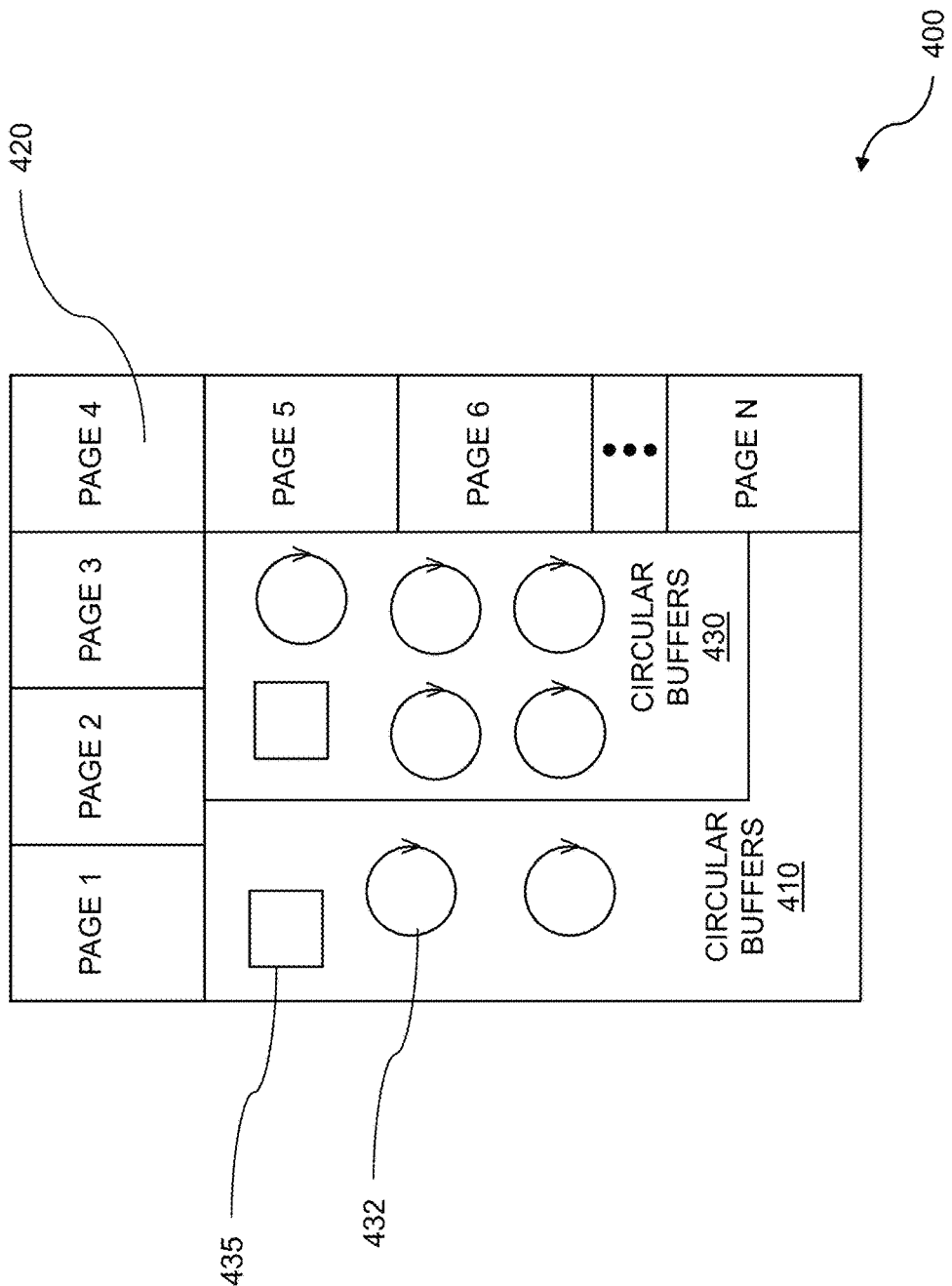
FIG. 4 is an apparatus showing page memory and circular buffers.

FIG. 4 is an apparatus showing page memory and circular buffers. The apparatus 400 comprises a swapping memory that can include a plurality of pages 420, shown in FIG. 4 as Page 1 through Page N. Each page is configured to store instructions from a group of circular buffers such as the circular buffer 432. As shown in FIG. 4, a first group of circular buffers 430 is present and comprises a plurality of circular buffers. A second group of circular buffers 410 is also present. In some embodiments, the first group of circular buffers 430 and the second group of circular buffers 410 comprise the same number of circular buffers, while in other embodiments, the first group of circular buffers 430 and the second group of circular buffers 410 comprise a differing number of circular buffers. As illustrated in FIG. 4, the first group of circular buffers 430 comprises five circular buffers while the second group of circular buffers 410 comprises two circular buffers. In embodiments, more than two groups of circular buffers are present. Each group of circular buffers interfaces to a set of switches and connections 435, which are configured and disposed to steer data to and from the circular buffers 432 and the paging memory 420.

The apparatus 400 can further comprise a further storage for a third copy of instructions for the plurality of circular buffers, where the further storage is coupled to the plurality of circular buffers, as well as a further set of switches and connections for transferring contents of the further storage to the plurality of circular buffers. Thus, a first copy of instructions might reside in page 1, a second copy of instructions might reside in page 2, and a third copy of instructions might reside in page 3, etc. Multiple pages are present across various embodiments, with any number of pages possible. The first copy (as well as any of the other copies) of the instructions can be swappable to a swapping memory, and can also be swappable to the further storage memory. The further storage memory can include a different page of memory. The first copy of instructions can be copied to a swapping memory before the third copy of instructions is moved into the plurality of circular buffers. In an operation such as this, the previous functionality of the logical elements can be restored at a later time by a paging control functionality.

Circular buffers other than the first plurality of circular buffers 430, such as the second plurality of circular buffers 410, can continue to rotate while the set of switches and connections transfers contents of the storage memory (from one or more pages) to the first plurality of circular buffers 430. As the circular buffers rotate, instructions that are delivered to the logical elements change. The instructions that change and are delivered to the logical elements can provide for the execution of a first sequence of operations by the logical elements.

The data from the storage memory can provide a second set of instructions to the logical elements. The second set of instructions can provide a second sequence of operations by the logical elements. The first sequence of operations and the second sequence of operations can differ. Thus, the collection of logical elements can be dynamically reconfigured to perform different functionality in a time-sharing manner. That is, the plurality of circular buffers can dynamically change operations of the logical elements based on circular buffer rotation.

For example, the logical elements can be configured for a first application (e.g. data decryption) and then, by paging in a new set of instructions, the logical elements can be configured for a second application (e.g. transmission of data). In cases where instructions and/or state information is saved prior to paging in the new set of instructions, the first application can be resumed after a predetermined time interval or upon occurrence of an event.

The apparatus 400 can include an apparatus for computation comprising: a plurality of circular buffers, where the plurality of circular buffers contains instructions for logical elements, coupled to the plurality of circular buffers, and where the plurality of circular buffers contains a first copy of instructions; a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers.

Figure 5:
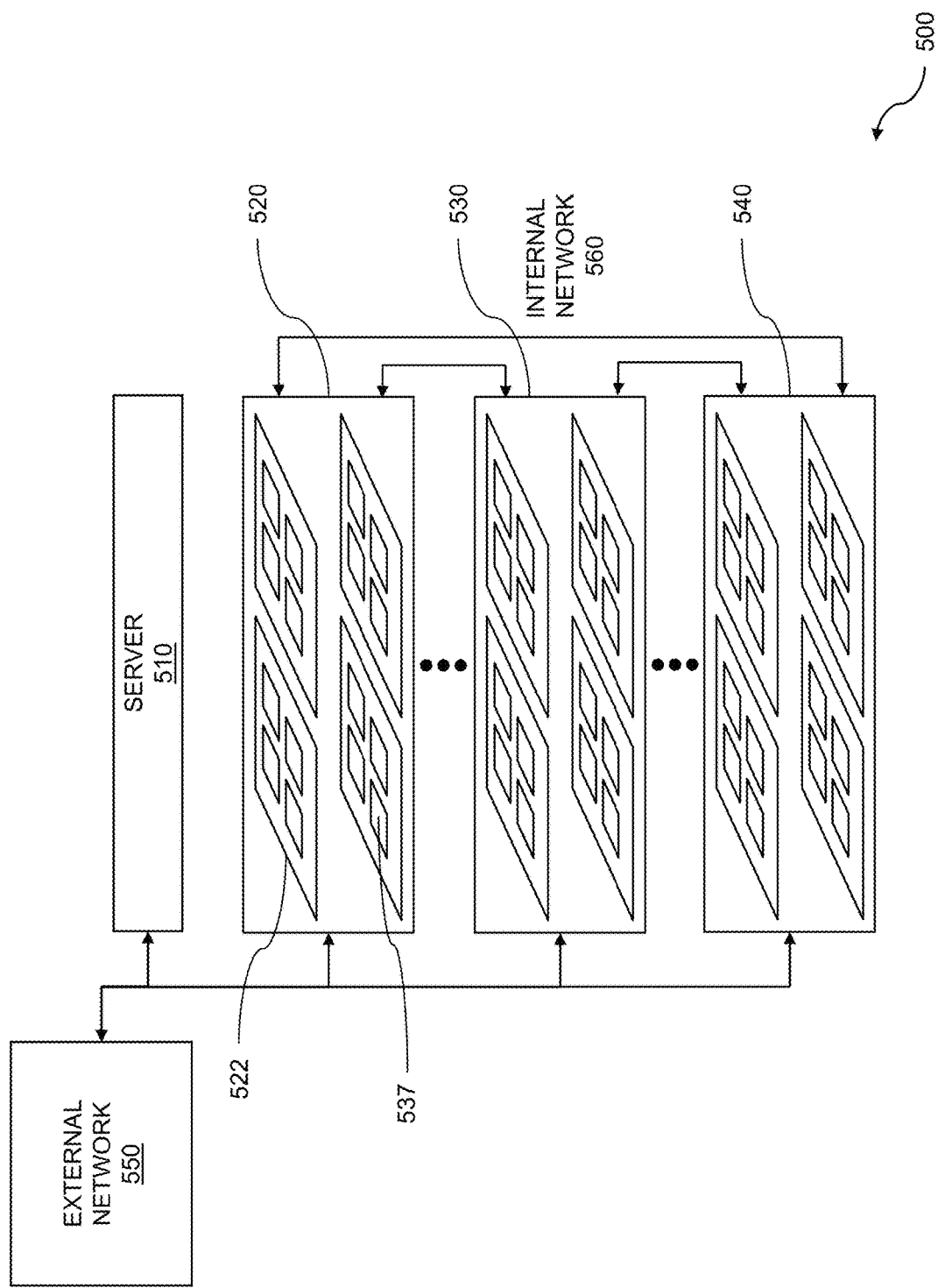
FIG. 5 illustrates a server allocating FIFOs and processing elements.

FIG. 5 shows an example server allocating a data flow graph. The data flow graph can be allocated to first in first out registers (FIFO) and processing elements. First in first out (FIFO) techniques can be used to support reconfigurable fabric data routing. The FIFOs and the processing elements can be elements within a reconfigurable fabric. The processing elements can be grouped into clusters. The processing elements can be configured to implement kernels, agents, a data flow graph, and so on, by scheduling the rotating circular buffers. The circular buffers can be statically scheduled. A plurality of kernels is allocated across a reconfigurable fabric that includes a plurality of clusters, where the plurality of kernels includes at least a first kernel and a second kernel. The first kernel is mounted in a first set of clusters, and the second kernel is mounted in a second set of clusters. Available routing is determined through the second set of clusters. A porosity map through the second set of clusters is calculated based on the available routing through the second set of clusters, and data is sent through the second set of clusters to the first set of clusters.

The system 500 can allocate one or more first-in first-outs (FIFOs) and processing elements (PEs) for reconfigurable fabric data routing. The system can include a server 510 allocating FIFOs and processing elements. In embodiments, system 500 includes one or more boxes, indicated by callouts 520, 530, and 540. Each box may have one or more boards, indicated generally as 522. Each board comprises one or more chips, indicated generally as 537. Each chip may include one or more processing elements, where at least some of the processing elements may execute a process agent, a kernel, or the like. An internal network 560 allows for communication between and among the boxes such that processing elements on one box can provide and/or receive results from processing elements on another box.

The server 510 may be a computer executing programs on one or more processors based on instructions contained in a non-transitory computer readable medium. The server 510 may perform reconfiguring of a mesh-networked computer system comprising a plurality of processing elements with a FIFO between one or more pairs of processing elements. In some embodiments, each pair of processing elements has a dedicated FIFO configured to pass data between the processing elements of the pair. The server 510 may receive instructions and/or input data from external network 550. The external network may provide information that includes, but is not limited to, hardware description language instructions (e.g. Verilog, VHDL, or the like), flow graphs, source code, or information in another suitable format.

The server 510 may collect performance statistics on the operation of the collection of processing elements. The performance statistics can include number of fork operations, join operations, average sleep time of a processing element, and/or a histogram of the sleep time of each processing element. Any outlier processing elements that sleep more than a predetermined threshold can be identified. In embodiments, the server can resize FIFOs or create new FIFOs to reduce the sleep time of a processing element that exceeds the predetermined threshold. Sleep time is essentially time when a processing element is not producing meaningful results, so it is generally desirable to minimize the amount of time a processing element spends in a sleep mode. In some embodiments, the server 510 may serve as an allocation manager to process requests for adding or freeing FIFOs, and/or changing the size of existing FIFOs in order to optimize operation of the processing elements.

In some embodiments, the server may receive optimization settings from the external network 550. The optimization settings may include a setting to optimize for speed, optimize for memory usage, or balance between speed and memory usage. Additionally, optimization settings may include constraints on the topology, such as a maximum number of paths that may enter or exit a processing element, maximum data block size, and other settings. Thus, the server 510 can perform a reconfiguration based on user-specified parameters via an external network 550.

Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include calculation input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PE). The processing elements can include a processor, a data memory, an instruction memory, communications capabilities, and so on. Multiple PEs can be grouped, where the groups can include pairs, quads, octets, etc. The PEs arranged in arrangements such as quads can be coupled to arithmetic units, where the arithmetic units can be coupled to or included in data processing units (DPU). The DPUs can be shared between and among quads. The DPUs can provide arithmetic techniques to the PEs, communications between quads, and so on.

The data flow processors, including data flow processors arranged in quads, can be loaded with kernels. The kernels can be a portion of a data flow graph. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. A configuration mode can be entered. Various techniques, including direct memory access (DMA) can be used to load instructions from the kernel into instruction memories of the PEs. The clusters that were preprogrammed to enter configuration mode can be preprogrammed to exit configuration mode. When configuration mode has been exited, execution of the one or more kernels loaded onto the clusters can commence. In embodiments, clusters can be reprogrammed and during the reprogramming, switch instructions used for routing are not disrupted so that routing continues through a cluster.

Data flow processes that can be executed by data flow processors can be managed by a software stack. A software stack can include a set of subsystems, including software subsystems, which may be needed to create a software platform. A complete software platform can include a set of software subsystems required to support one or more applications. A software stack can include offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so one. The agent source code that can be operated on by the software development kit can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit can include a variety of tools which can be used to support a deep learning technique or other technique which requires processing of large amounts of data such as unstructured data. The SDK can support multiple machine learning techniques such as machine learning techniques based on GEMM™, sigmoid, and so on. The SDK can include a low-level virtual machine (LLVM) which can serve as a front end to the SDK. The SDK can include a simulator. The SDK can include a Boolean satisfiability solver (SAT solver). The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a flow graph.

Figure 6:
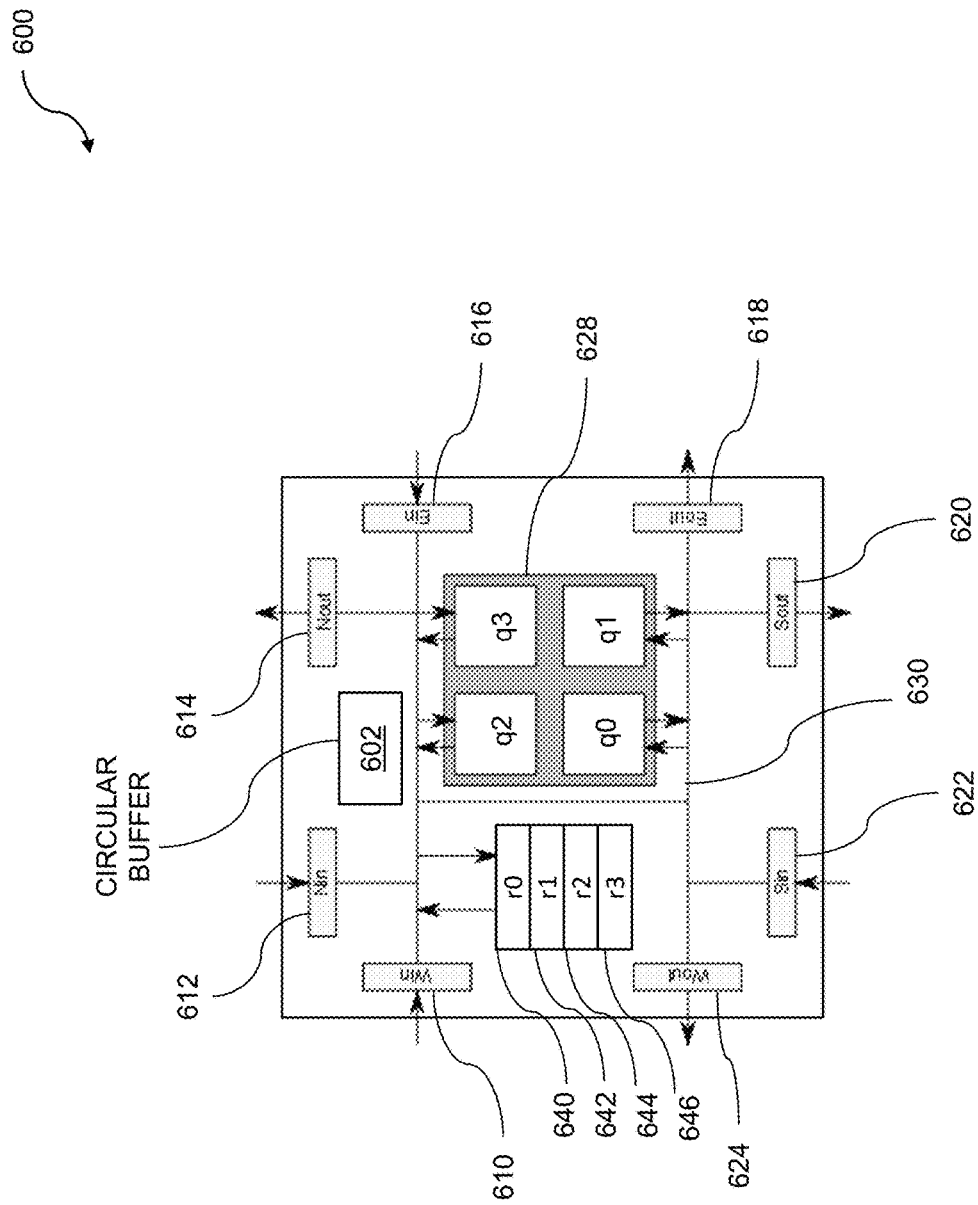
FIG. 6 shows a cluster for coarse-grained reconfigurable processing.

FIG. 6 shows a cluster for coarse-grained reconfigurable processing. The cluster 600 for coarse-grained reconfigurable processing can be used for reconfigurable fabric data routing. The reconfigurable fabric data routing includes allocating a plurality of kernels across a reconfigurable fabric which includes a plurality of clusters, where the plurality of kernels includes at least a first kernel and a second kernel. The clusters can include processing elements, switching elements, storage elements, and so on. The first kernel is mounted in a first set of clusters within the plurality of clusters, and a second kernel is mounted in a second set of clusters within the plurality of clusters. Available routing is determined through the second set of clusters. A porosity map through the second set of clusters is calculated based on the available routing through the second set of clusters. Data is sent through the second set of clusters to the first set of clusters based on the porosity map. The available routing through the second set of clusters can be a function of operations being performed by the second kernel, and the available routing can change during execution of the second kernel.

The cluster 600 comprises a circular buffer 602. The circular buffer 602 can be referred to as a main circular buffer or a switch-instruction circular buffer. In some embodiments, the cluster 600 comprises additional circular buffers corresponding to processing elements within the cluster. The additional circular buffers can be referred to as processor instruction circular buffers. The example cluster 600 comprises a plurality of logical elements, configurable connections between the logical elements, and a circular buffer 602 controlling the configurable connections. The logical elements can further comprise one or more of switching elements, processing elements, or storage elements. The example cluster 600 also comprises four processing elements—q0, q1, q2, and q3. The four processing elements can collectively be referred to as a "quad," and can be jointly indicated by a grey reference box 628. In embodiments, there is intercommunication among and between each of the four processing elements. In embodiments, the circular buffer 602 controls the passing of data to the quad of processing elements 628 through switching elements. In embodiments, the four processing elements 628 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message transfer via a bus or shared memory interface. Power gating can be applied to one or more processors (e.g. q1) in order to reduce power.

The cluster 600 can further comprise storage elements coupled to the configurable connections. As shown, the cluster 600 comprises four storage elements—r0 640, r1 642, r2 644, and r3 646. The cluster 600 further comprises a north input (Nin) 612, a north output (Nout) 614, an east input (Ein) 616, an east output (Eout) 618, a south input (Sin) 622, a south output (Sout) 620, a west input (Win) 610, and a west output (Wout) 624. The circular buffer 602 can contain switch instructions that implement configurable connections. For example, an instruction effectively connects the west input 610 with the north output 614 and the east output 618 and this routing is accomplished via bus 630. The cluster 600 can further comprise a plurality of circular buffers residing on a semiconductor chip where the plurality of circular buffers controls unique, configurable connections between the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

A preprocessor or compiler can be configured to prevent data collisions within the circular buffer 602. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 624 to an instruction placing data on the south output 620, such that the data can be output on both output ports within the same pipeline cycle. In a case where data needs to travel to a cluster that is both south and west of the cluster 600, it can be more efficient to send the data directly to the south output port rather than to store the data in a register first, and then to send the data to the west output on a subsequent pipeline cycle.

An L2 switch interacts with the instruction set. A switch instruction typically has both a source and a destination. Data is accepted from the source and sent to the destination. There are several sources (e.g. any of the quads within a cluster, any of the L2 directions—North, East, South, West, a switch register, or one of the quad RAMs—data RAM, IRAM, PE/Co Processor Register). As an example, to accept data from any L2 direction, a "valid" bit is used to inform the switch that the data flowing through the fabric is indeed valid. The switch will select the valid data from the set of specified inputs. For this to function properly, only one input can have valid data, and the other inputs must all be marked as invalid. It should be noted that this fan-in operation at the switch inputs operates independently for control and data. There is no requirement for a fan-in mux to select data and control bits from the same input source. Data valid bits are used to select valid data, and control valid bits are used to select the valid control input. There are many sources and destinations for the switching element, which can result in excessive instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can perform any safe function of the two inputs. For example, the fan-in could implement a logical OR of the input data. Any output data is acceptable because the input condition is an error, so long as no damage is done to the silicon. In the event that a bit is set to '1' for both inputs, an output bit should also be set to '1'. A switch instruction can accept data from any quad or from any neighboring L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical, or a combination (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A" to initiate a transfer of data between cluster "B" and cluster "C" without any involvement of the processing elements in clusters "B" and "C". Furthermore, cluster "A" can initiate a fan-out transfer of data from cluster "B" to clusters "C", "D", and so on, where each destination cluster writes a copy of the DMA data to different locations within their Quad RAMs. A DMA mechanism may also be used for programming instructions into the instruction RAMs.

Accesses to RAMs in different clusters can travel through the same DMA path, but the transactions must be separately defined. A maximum block size for a single DMA transfer can be 8 KB. Accesses to data RAMs can be performed either when the processors are running or while the processors are in a low power "sleep" state. Accesses to the instruction RAMs and the PE and Co-Processor Registers may be performed during configuration mode. The quad RAMs may have a single read/write port with a single address decoder, thus allowing shared access by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

In embodiments, the computations that can be performed on a cluster for coarse-grained reconfigurable processing can be represented by a data flow graph. Data flow processors, data flow processor elements, and the like, are particularly well suited to processing the various nodes of data flow graphs. The data flow graphs can represent communications between and among agents, matrix computations, tensor manipulations, Boolean functions, and so on. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of high quality data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PE). The processing elements can include a processor, a data memory, an instruction memory, communications capabilities, and so on. Multiple PEs can be grouped, where the groups can include pairs, quads, octets, etc. The PEs arranged in configurations such as quads can be coupled to arithmetic units, where the arithmetic units can be coupled to or included in data processing units (DPU). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value of minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0 then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the clusters enter the configuration mode, various techniques, including direct memory access (DMA) can be used to load instructions from the kernel into instruction memories of the PEs. The clusters that were preprogrammed configuration mode can also be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as those based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

A reconfigurable fabric can include quads of elements. The elements of the reconfigurable fabric can include processing elements, switching elements, storage elements, and so on. An element such as a storage element can be controlled by a rotating circular buffer. In embodiments, the rotating circular buffer can be statically scheduled. The data operated on by the agents that are resident within the reconfigurable buffer can include tensors. Tensors can include one or more blocks. The reconfigurable fabric can be configured to process tensors, tensor blocks, tensors and blocks, etc. One technique for processing tensors includes deploying agents in a pipeline. That is, the output of one agent can be directed to the input of another agent. Agents can be assigned to clusters of quads, where the clusters can include one or more quads. Multiple agents can be pipelined when there are sufficient clusters of quads to which the agents can be assigned. Multiple pipelines can be deployed. Pipelining of the multiple agents can reduce the sizes of input buffers, output buffers, intermediate buffers, and other storage elements. Pipelining can further reduce memory bandwidth needs of the reconfigurable fabric.

Agents can be used to support dynamic reconfiguration of the reconfigurable fabric. The agents that support dynamic reconfiguration of the reconfigurable fabric can include interface signals in a control unit. The interface signals can include suspend, agent inputs empty, agent outputs empty, and so on. The suspend signal can be implemented using a variety of techniques such as a semaphore, a streaming input control signal, and the like. When a semaphore is used, the agent that is controlled by the semaphore can monitor the semaphore. In embodiments, a direct memory access (DMA) controller can wake the agent when the setting of the semaphore has been completed. The streaming control signal, if used, can wake a control unit if the control unit is sleeping. A response received from the agent can be configured to interrupt the host software.

The suspend semaphore can be asserted by runtime software in advance of commencing dynamic reconfiguration of the reconfigurable fabric. Upon detection of the semaphore, the agent can begin preparing for entry into a partially resident state. A partially resident state for the agent can include having the agent control unit resident after the agent kernel is removed. The agent can complete processing of any currently active tensor being operated on by the agent. In embodiments, a done signal and a fire signal may be sent to upstream or downstream agents, respectively. A done signal can be sent to the upstream agent to indicate that all data has been removed from its output buffer. A fire signal can be sent to a downstream agent to indicate that data in the output buffer is ready for processing by the downstream agent. The agent can continue to process incoming done signals and fire signals, but will not commence processing of any new tensor data after completion of the current tensor processing by the agent. The semaphore can be reset by the agent to indicate to a host that the agent is ready to be placed into partial residency. In embodiments, having the agent control unit resident after the agent kernel is removed comprises having the agent partially resident. A control unit may not assert one or more signals, nor expect one or more responses from a kernel in the agent, when a semaphore has been reset.

Other signals from an agent can be received by a host. The signals can include an agent inputs empty signal, an agent outputs empty signal, and so on. The agent inputs empty signal can be sent from the agent to the host and can indicate that the input buffers are empty. The agent inputs empty signal can only be sent from the agent when the agent is partially resident. The agent outputs empty signal can be sent from the agent to the host and can indicate that the output buffers are empty. The agent outputs empty can only be sent from the agent to the host when the agent is partially resident. When the runtime (host) software receives both signals, agent inputs empty and agent outputs empty, from the partially resident agent, the agent can be swapped out of the reconfigurable fabric and can become fully vacant.

Recall that an agent can be one of a plurality of agents that form a data flow graph. The data flow graph can be based on a plurality of subgraphs. The data flow graph can be based on agents which can support three states of residency: fully resident, partially resident, and fully vacant. A complete subsection (or subgraph) based on the agents that support the three states of residency can be swapped out of the reconfigurable fabric. The swapping out of the subsection can be based on asserting a suspend signal input to an upstream agent. The asserting of the suspend signal can be determined by the runtime software. When a suspend signal is asserted, the agent can stop consuming input data such as an input sensor. The tensor can queue within the input buffers of the agent. The agent kernel can be swapped out of the reconfigurable fabric, leaving the agent partially resident while the agent waits for the downstream agents to drain the output buffers for the agent. When an upstream agent is fully resident, the agent may not be able to fully vacant because a fire signal might be sent to the agent by the upstream agent. When the upstream agent is partially resident or is fully vacant, then the agent can be fully vacated from the reconfigurable fabric. The agent can be fully vacated if it asserts both the input buffers empty and output buffers empty signals.

Figure 7:
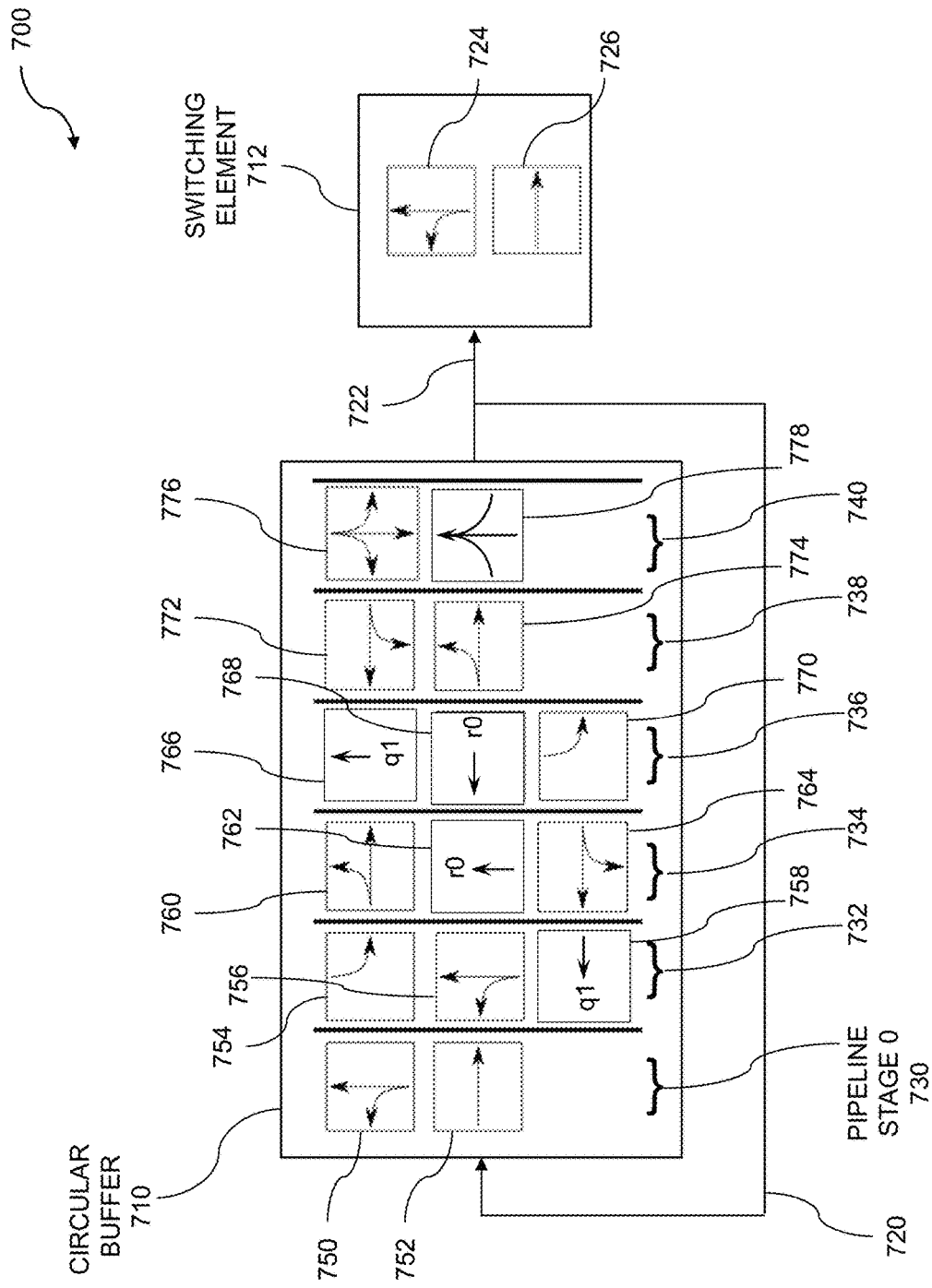
FIG. 7 is an example circular buffer with a switching element.

FIG. 7 shows a block diagram of a circular buffer. The circular buffer 710 can include a switching element 712 corresponding to the circular buffer. The circular buffer and the corresponding switching element can be used in part for reconfigurable fabric data routing. Using the circular buffer 710 and the corresponding switching element 712, data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The example block diagram 700 describes a processor-implemented method for data manipulation. The circular buffer 710 contains a plurality of pipeline stages. Each pipeline stage contains one or more instructions, up to a maximum instruction depth. In the embodiment shown in FIG. 7, the circular buffer 710 is a 6×3 circular buffer, meaning that it implements a six-stage pipeline with an instruction depth of up to three instructions per stage (column). Hence, the circular buffer 710 can include one, two, or three switch instruction entries per column. In some embodiments, the plurality of switch instructions per cycle can comprise two or three switch instructions per cycle. However, in certain embodiments, the circular buffer 710 supports only a single switch instruction in a given cycle. In the example 700 shown, Pipeline Stage 0 730 has an instruction depth of two instructions 750 and 752. Though the remaining pipeline stages 1-5 are not textually labeled in the FIG. 700, the stages are indicated by callouts 732, 734, 736, 738, and 740. Pipeline stage 1 732 has an instruction depth of three instructions 754, 756, and 758. Pipeline stage 2 734 has an instruction depth of three instructions 760, 762, and 764. Pipeline stage 3 736 also has an instruction depth of three instructions 766, 768, and 770. Pipeline stage 4 738 has an instruction depth of two instructions 772 and 774. Pipeline stage 5 740 has an instruction depth of two instructions 776 and 778. In embodiments, the circular buffer 710 includes 64 columns. During operation, the circular buffer 710 rotates through configuration instructions. The circular buffer 710 can dynamically change operation of the logical elements based on the rotation of the circular buffer. The circular buffer 710 can comprise a plurality of switch instructions per cycle for the configurable connections.

The instruction 752 is an example of a switch instruction. In embodiments, each cluster has four inputs and four outputs, each designated within the cluster's nomenclature as "north," "east," "south," and "west" respectively. For example, the instruction 752 in the diagram 700 is a west-to-east transfer instruction. The instruction 752 directs the cluster to take data on its west input and send out the data on its east output. In another example of data routing, the instruction 750 is a fan-out instruction. The instruction 750 instructs the cluster to take data from its south input and send out on the data through both its north output and its west output. The arrows within each instruction box indicate the source and destination of the data. The instruction 778 is an example of a fan-in instruction. The instruction 778 takes data from the west, south, and east inputs and sends out the data on the north output. Therefore, the configurable connections can be considered to be time multiplexed.

In embodiments, the clusters implement multiple storage elements in the form of registers. In the example 700 shown, the instruction 762 is a local storage instruction. The instruction 762 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

The obtaining data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of sleep state when the transfer is complete. This waking is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of sleep by the arrival of valid data (or control) following the execution of a switch instruction. A processing element or switching element can determine why it was brought out of a sleep state by the context of the code that the element starts to execute. A cluster can be awoken during a DMA operation by the arrival of valid data. The DMA instruction can be executed while the cluster remains asleep and awaits the arrival of valid data. Upon arrival of the valid data, the cluster is woken and the data stored. Accesses to one or more data random access memories (RAM) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 758 is a processing instruction. The instruction 758 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 700 shown, the circular buffer 710 rotates instructions in each pipeline stage into switching element 712 via a forward data path 722, and also back to a pipeline stage 0 730 via a feedback data path 720. Instructions can include switching instructions, storage instructions, and processing instructions, among others. The feedback data path 720 can allow instructions within the switching element 712 to be transferred back to the circular buffer. Hence, the instructions 724 and 726 in the switching element 712 can also be transferred back to pipeline stage 0 as the instructions 750 and 752. In addition to the instructions depicted on FIG. 7, a no-op instruction can also be inserted into a pipeline stage. In embodiments, a no-op instruction causes execution to not be performed for a given cycle. In effect, the introduction of a no-op instruction can cause a column within the circular buffer 710 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using null convention logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by a stimulus external to the logical element and not based on the programming of the logical element. The external stimulus can include an input signal, which in turn can cause a wake up or an interrupt service request to execute on one or more of the logical elements. An example of such a wake-up request can be seen in the instruction 758, assuming that the processor q1 was previously in a sleep state. In embodiments, when the instruction 758 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 766. In the case of the instruction 766, data from the processor q1 is moved to the north output. In some embodiments, if Xs have been placed into the processor q1, such as during the instruction 758, then Xs would be retrieved from the processor q1 during the execution of the instruction 766 and would be applied to the north output of the instruction 766.

A collision occurs if multiple instructions route data to a particular port in a given pipeline stage. For example, if instructions 752 and 754 are in the same pipeline stage, they will both send data to the east output at the same time, thus causing a collision since neither instruction is part of a time-multiplexed fan-in instruction (such as the instruction 778). To avoid potential collisions, certain embodiments use preprocessing, such as by a compiler, to arrange the instructions in such a way that there are no collisions when the instructions are loaded into the circular buffer. Thus, the circular buffer 710 can be statically scheduled in order to prevent data collisions. Thus, in embodiments, the circular buffers are statically scheduled. In embodiments, when the preprocessor detects a data collision, the scheduler changes the order of the instructions to prevent the collision. Alternatively, or additionally, the preprocessor can insert further instructions such as storage instructions (e.g. the instruction 762), sleep instructions, or no-op instructions, to prevent the collision. Alternatively, or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the Read transfer is mastered by the DMA controller in the interface. It includes a credit count that keeps track of the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will make sure the memory bit is reset to 0 which thereby prevents a microDMA controller in the source cluster from sending more data.

Each slave interface manages four interfaces between the FIFOs and the fabric. Each interface can contain up to 15 data channels. Therefore, a slave should manage read/write queues for up to 60 channels. Each channel can be programmed to be a DMA channel, or a streaming data channel. DMA channels are managed using a DMA protocol. Streaming data channels are expected to maintain their own form of flow control using the status of the Rx FIFOs (obtained using a query mechanism). Read requests to slave interfaces use one of the flow control mechanisms described previously.

Figure 8:
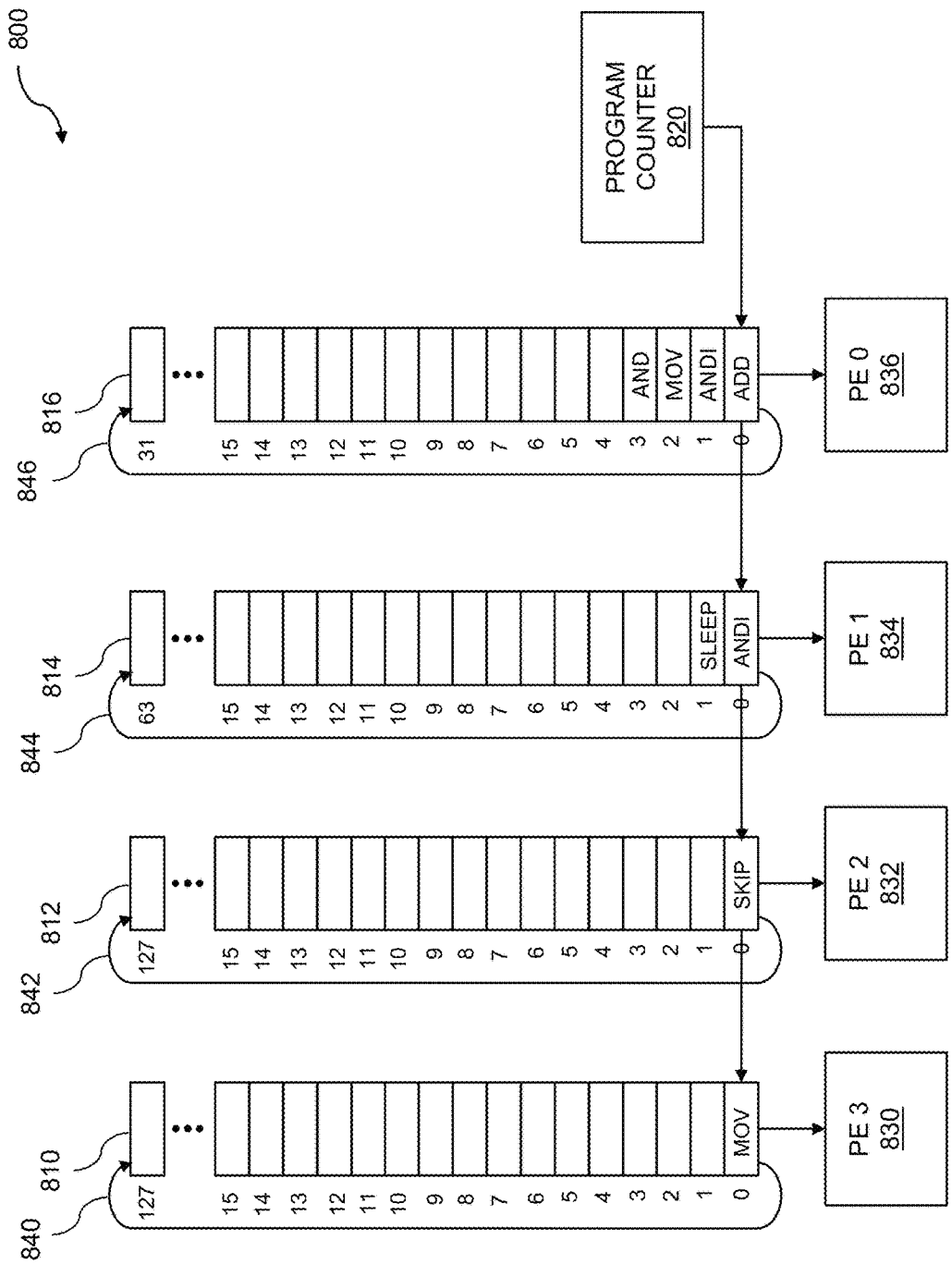
FIG. 8 shows example circular buffers and processing elements.

FIG. 8 shows example circular buffers and processing elements. A diagram 800 indicates example instruction execution for processing elements. The processing elements can include a portion of or all of the elements within a reconfigurable fabric. The instruction execution can include instructions for reconfigurable fabric data routing. A plurality of kernels is allocated across a reconfigurable fabric which includes a plurality of clusters, where the plurality of kernels includes at least a first kernel and a second kernel. The clusters can include processing elements, switching elements, storage elements, and so on. The first kernel is mounted in a first set of clusters, and a second kernel is mounted in a second set of clusters. Available routing is determined through the second set of clusters. A porosity map through the second set of clusters is calculated based on the available routing through the second set of clusters. Data is sent through the second set of clusters to the first set of clusters based on the porosity map. The available routing through the second set of clusters can change during execution of the second kernel.

A circular buffer 810 feeds a processing element 830. A second circular buffer 812 feeds another processing element 832. A third circular buffer 814 feeds another processing element 834. A fourth circular buffer 816 feeds another processing element 836. The four processing elements 830, 832, 834, and 836 can represent a quad of processing elements. In embodiments, the processing elements 830, 832, 834, and 836 are controlled by instructions received from the circular buffers 810, 812, 814, and 816. The circular buffers can be implemented using feedback paths 840, 842, 844, and 846, respectively. In embodiments, the circular buffer can control the passing of data to a quad of processing elements through switching elements, where each of the quad of processing elements is controlled by four other circular buffers (as shown in the circular buffers 810, 812, 814, and 816) and where data is passed back through the switching elements from the quad of processing elements, where the switching elements are again controlled by the main circular buffer. In embodiments, a program counter 820 is configured to point to the current instruction within a circular buffer. In embodiments with a configured program counter, the contents of the circular buffer are not shifted or copied to new locations on each instruction cycle. Rather, the program counter 820 is incremented in each cycle to point to a new location in the circular buffer. The circular buffers 810, 812, 814, and 816 can contain instructions for the processing elements. The instructions can include, but are not limited to, move instructions, skip instructions, logical AND instructions, logical AND-Invert (e.g. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction and the instruction in the circular buffer can be ignored and the corresponding operation not performed.

In some embodiments, the circular buffers 810, 812, 814, and 816 could all have the same length, for example, 128 instructions. However, in other embodiments, the plurality of circular buffers can have differing lengths. That is, the plurality of circular buffers can comprise circular buffers of differing sizes. As shown in FIG. 8, the first two circular buffers 810 and 812 have a length of 128 instructions, the third circular buffer 814 has a length of 64 instructions, and the fourth circular buffer 816 has a length of 32 instructions, but other circular buffer lengths are also possible. The plurality of circular buffers that have differing lengths can resynchronize with a zeroth pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 8, different circular buffers can have different instruction sets within them. For example, the first circular buffer 810 contains a MOV instruction. The second circular buffer 812 contains a SKIP instruction. The third circular buffer 814 contains a SLEEP instruction and an ANDI instruction. The fourth circular buffer 816 contains an AND instruction, a MOVE instruction, an ANDI instruction, and an ADD instruction. The operations performed by the processing elements 830, 832, 834, and 836 are dynamic and can change over time, based on the instructions loaded into the respective circular buffers. As the circular buffers rotate, new instructions can be executed by the respective processing element.

Figure 9:
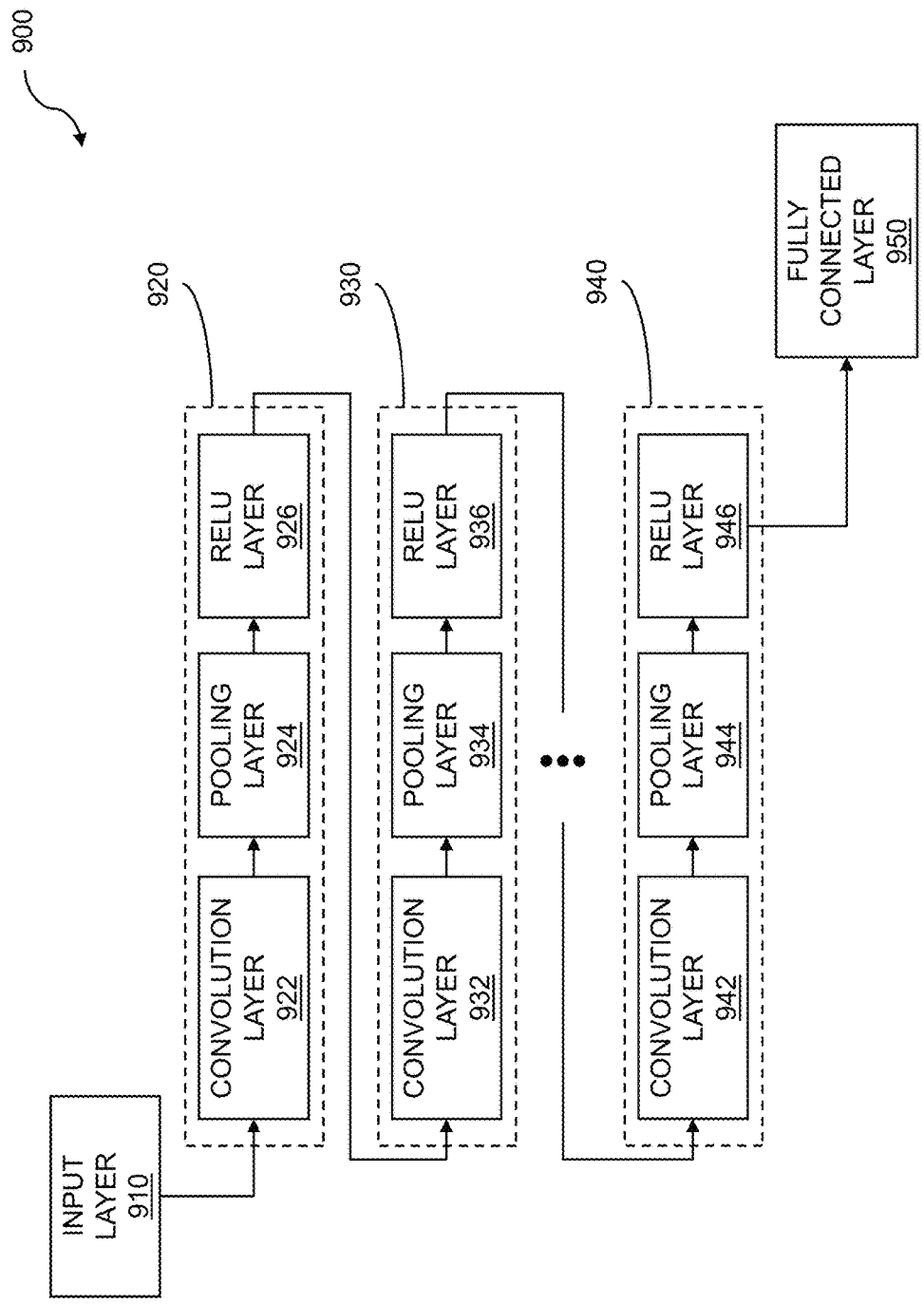
FIG. 9 shows a deep learning block diagram.

FIG. 9 shows a deep learning block diagram. The deep learning block diagram 900 can include a neural network such as a deep neural network (DNN), a convolutional neural network (CNN), a recurrent neural network (RNN), and so on. A convolutional neural network or other neural network can be based on layers, where the layers can include input layers, output layers, fully connected layers, convolution layers, pooling layers, rectified linear unit (ReLU) layers, and so on. The layers can include machine learned layers for reconfigurable fabric data routing. The reconfigurable fabric can include processing elements, switching elements, storage elements, etc. The reconfigurable fabric can be used to perform various operations such as logical operations. Deep learning can support reconfigurable fabric data routing. A plurality of kernels is allocated across a reconfigurable fabric comprised of a plurality of clusters. The plurality of kernels includes at least a first kernel and a second kernel. The first kernel is mounted in a first set of clusters, and the second kernel is mounted in a second set of clusters. A porosity map through the second set of clusters is calculated based on the available routing through the second set of clusters, and data is sent through the second set of clusters to the first set of clusters.

The deep learning block diagram 900 can include various layers, where the layers can include an input layer, hidden layers, a fully connected layer, and so on. In some embodiments, the deep learning block diagram can include a classification layer. The input layer 910 can receive input data, where the input data can include a first obtained data group, a second obtained data group, a third obtained data group, a fourth obtained data group, etc. The obtaining of the data groups can be performed in a first locality, a second locality, a third locality, a fourth locality, and so on, respectively. The input layer can then perform processing such as partitioning obtained data into non-overlapping partitions. The deep learning block diagram 900, which can represent a network such as a convolutional neural network, can contain a plurality of hidden layers. While three hidden layers, hidden layer 920, hidden layer 930, and hidden layer 940 are shown, other numbers of hidden layers may be present. Each hidden layer can include layers that perform various operations, where the various layers can include a convolution layer, a pooling layer, and a rectifier layer such as a rectified linear unit (ReLU) layer. Thus, layer 920 can include convolution layer 922, pooling layer 924, and ReLU layer 926; layer 930 can include convolution layer 932, pooling layer 934, and ReLU layer 936; and layer 940 can include convolution layer 942, pooling layer 944, and ReLU layer 946. The convolution layers 922, 932, and 942 can perform convolution operations; the pooling layers 924, 934, and 944 can perform pooling operations, including max pooling, such as data down-sampling; and the ReLU layers 926, 936, and 946 can perform rectification operations. A convolutional layer can reduce the amount of data feeding into a fully connected layer. The deep learning block diagram 900 can include a fully connected layer 950. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PE). The processing elements can include a processor, a data memory, an instruction memory, communications capabilities, and so on. Multiple PEs can be grouped, where the groups can include pairs, quads, octets, etc. The PEs configured in arrangements such as quads can be coupled to arithmetic units, where the arithmetic units can be coupled to or included in data processing units (DPU). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0 then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were pre-programmed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 10:
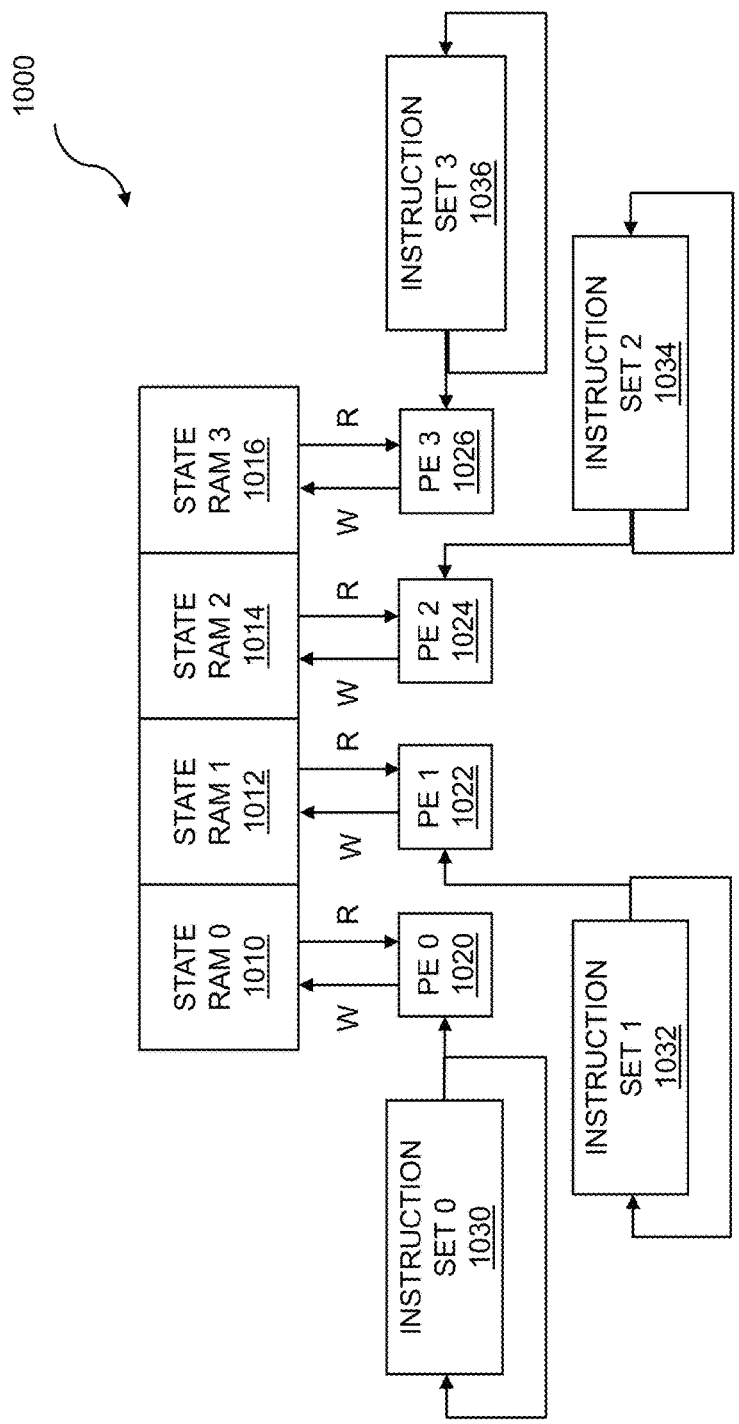
FIG. 10 shows example memory and processing elements.

FIG. 10 shows an example of memory and processing elements. In the example 1000, a plurality of instruction sets are stored in circular buffers. An instruction set 0 1030 is configured and disposed to provide instructions to a processing element PE 0 1020. An instruction set 1 1032 is configured and disposed to provide instructions to a processing element PE 1 1022. An instruction set 2 1034 is configured and disposed to provide instructions to a processing element PE 2 1024. An instruction set 3 1036 is configured and disposed to provide instructions to a processing element PE 3 1026. Instruction set 0 1030, instruction set 1 1032, instruction set 2 1034, and instruction set 3 1036 can each be comprised of a branchless instruction set. Each processing element can have a corresponding state RAM. The state RAM is a memory that holds state information about each processing element. Such state information can include, but is not limited to, program counter values, stack pointer values, return addresses, and other register values. As shown in the example 1000, each processing element has its own state RAM. The processing element PE 0 1020 is configured and disposed to read and write state information to/from a state RAM 0 1010. The processing element PE 1 1022 is configured and disposed to read and write state information to/from a state RAM 1 1012. The processing element PE 2 1024 is configured and disposed to read and write state information to/from a state RAM 2 1014. The processing element PE 3 1026 is configured and disposed to read and write state information to/from a state RAM 3 1016. Note that while four processing elements are illustrated in FIG. 10, other embodiments can have more or fewer processing elements.

The example 1000 can include stable configuration logic to maintain a stable configuration while rotation occurs. Stabilization logic can be used to effectively disengage one or more processing elements while a swapping/paging operation takes place. The disengaging prevents nondeterministic behavior as new instructions are loaded into the circular buffers. Other circular buffers than the plurality of circular buffers can continue to rotate while a third copy of instructions is transferred to the plurality of circular buffers. In some embodiments, the circular buffers are reprogrammed without stopping or pausing execution of processing elements. In such an embodiment, as the program counter advances from the first instruction location of the circular buffer, new instructions from the paging memory are written into the locations of the circular buffer that have already executed for a given cycle. When the program counter gets to the last location of the circular buffer, it then restarts from the first location with a new set of instructions that have been copied in from the paging/swappable memory.

Figure 11:
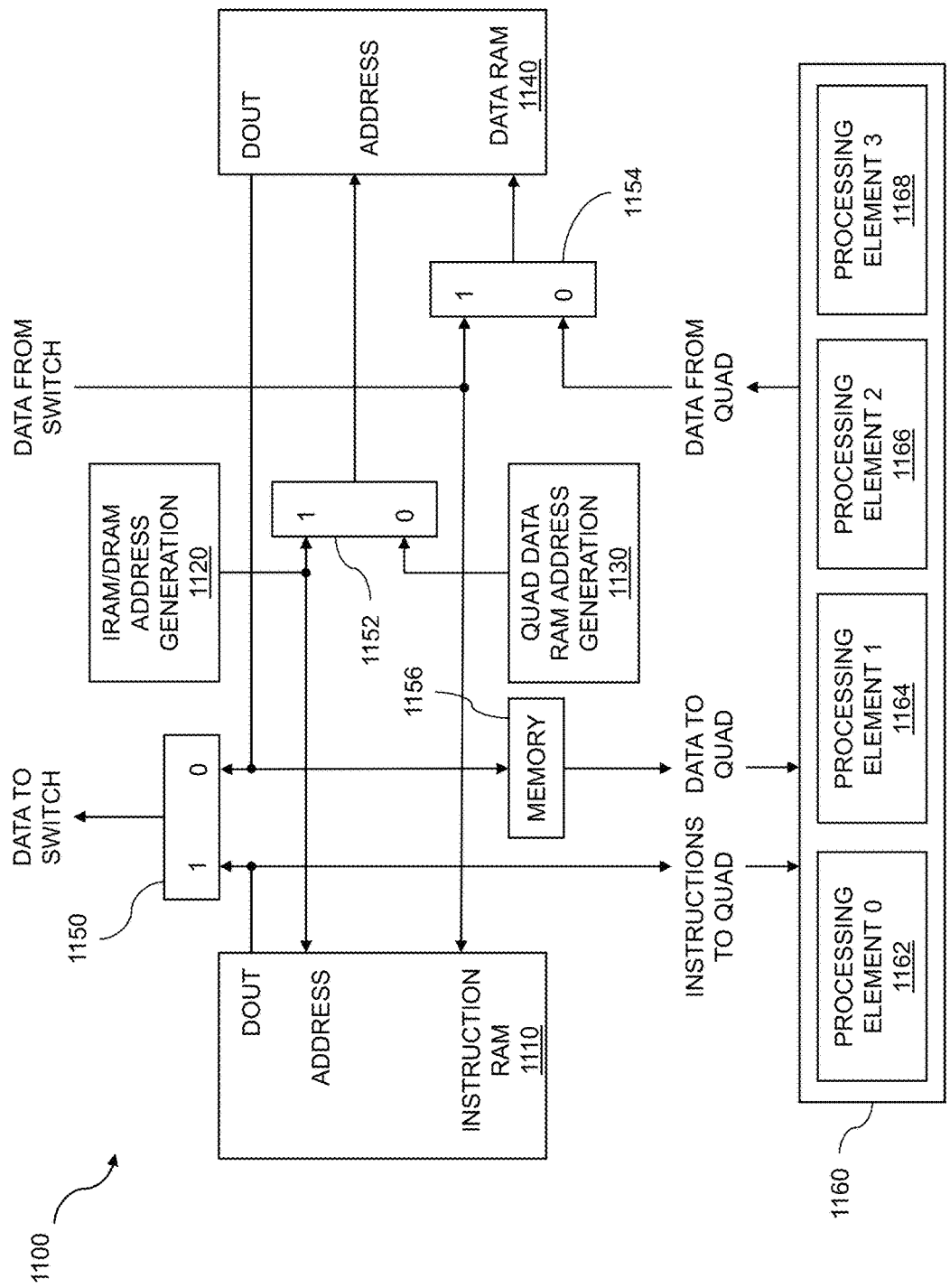
FIG. 11 is an architecture showing access sharing of processing elements.

FIG. 11 is an architecture 1100 showing access sharing of processing elements. A quad 1160 comprises four processing elements: a processing element 0 1162, a processing element 1 1164, a processing element 2 1166, and a processing element 3 1168. To implement paging operations, instructions and data (including state information) are transferred to and from the processing elements of the quad 1160. An instruction RAM 1110 contains instructions that, when executed by processing elements, perform logical operations. The instructions in instruction RAM 1110 can comprise a branchless instruction set. A data RAM 1140 contains data (which can include state data) that is used by the processing elements during logical operations, and during the resumption of execution of previously loaded instruction sets. The data from the data RAM 1140 can be routed through a switch (mux) 1150 to additional switches that can be part of a fabric. The data from the data RAM 1140 can also be routed to a memory 1156 and then in turn provided to the processing elements 1162, 1164, 1166 and 1168 of the quad 1160. In embodiments, the memory 1156 is used to delay data to the quad 1160 by one or more cycles.

During a paging operation, in some cases, before loading a new instruction set into circular buffers, the current instruction set can be saved off to the paging memory and can further include saving data, such as state data that is associated with the current execution of the processing elements. In such an operation, data from the quad 1160 can be routed through a switch (mux) 1154 to the data RAM 1140.

A quad data RAM address generation 1130 contains logic that facilitates stepping through the state data stored in the data RAM 1140. Similarly, an IRAM/DRAM address generation 1120 contains logic that facilitates stepping through the data stored in the instruction RAM 1110. The stored data is used when loading up the instruction RAM 1110 and the data RAM 1140, and also input to the switch 1150. The data is then routed to additional switches that are part of the switches and connections going to and from the paging memory and the circular buffers and registers. The quad data RAM address generation 1130 and the IRAM/DRAM address generation 1120 are fed through a switch 1152 to the data RAM 1140. The data RAM 1140 can be updated based on instructions that are executed from the instruction RAM 1110. In embodiments, there is arbitration between the processing elements 1162, 1164, 1166, and 1168.

Figure 12:
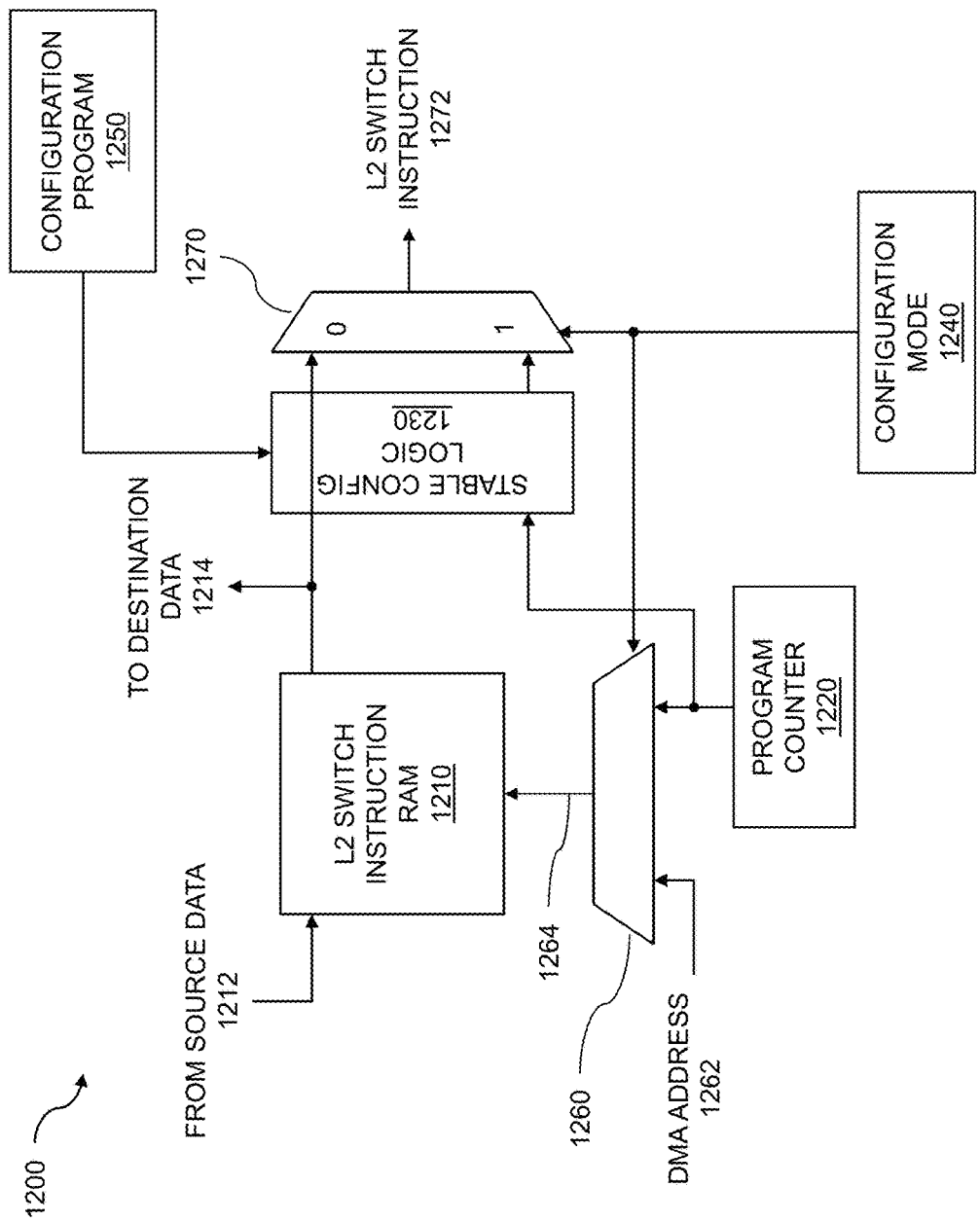
FIG. 12 shows an example switching architecture with stability logic.

FIG. 12 shows an example switching architecture 1200 with stability logic. Stability logic can be used to safely perform paging/swapping operations on circular buffers while avoiding nondeterministic behavior. In some cases, the processing elements can be paused or taken offline to perform the paging operation. A configuration program 1250 contains memory which can be used to load a level 2 switch instruction RAM 1210 with instructions. The instructions can be in the form of operations on a circular buffer similar to those described earlier. In embodiments, the configuration program contains two instructions, one for the write path to destination data 1214, and one for the read path from source data 1212. The stable configuration logic 1230 can be coupled to one or more processing elements to put the processing elements into stabilized mode. The processing elements can be in a paused state or offline mode, disconnected from a program counter 1220. The disconnection serves to prevent execution of the instructions in circular buffers as the circular buffer contents (instructions) are being updated. Once the circular buffers are updated, the stable configuration logic can return the processing elements to the normal mode. The configuration mode 1240 is a signal that controls the level two switch instruction 1272, which is output to a switch and then forwarded on to logical elements. Thus, the configuration mode can select normal operation (through a path 0 of a switch 1270), or the stabilization mode (through a path 1 of the switch 1270). The configuration mode 1240 also controls another switch 1260 such that, when in stabilizing mode, a DMA address 1262 is selected for input 1264 into the level 2 switch instruction RAM 1210, and when in normal operation, the program counter 1220 is selected for input 1264 into the level 2 switch instruction RAM 1210.

Figure 13:
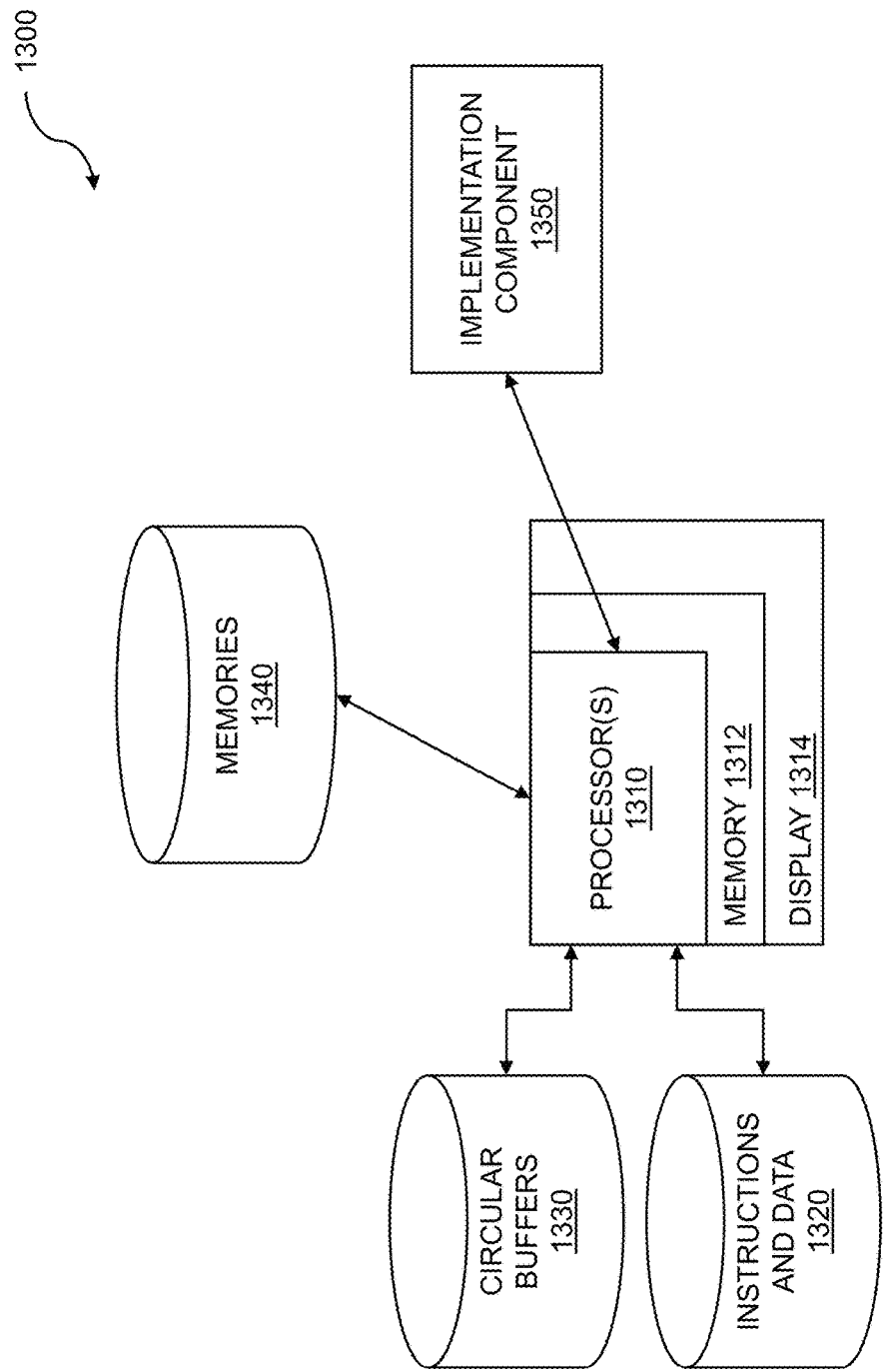
FIG. 13 is a system diagram for implementing branchless instruction paging logic.

FIG. 13 is a system diagram for implementing branchless instruction paging logic. The system 1300 can include a computer-implemented method of logic implementation comprising: designing a processing architecture comprising: a plurality of circular buffers where the plurality of circular buffers contains instructions for logical elements that are coupled to the plurality of circular buffers, and where the plurality of circular buffers contains a first copy of instructions comprising a branchless instruction set; a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers.

The system 1300 can include a computer program product embodied in a non-transitory computer readable medium for implementation of a logical calculation apparatus comprising: code for designing a processing architecture including: a plurality of circular buffers where the plurality of circular buffers contains instructions for logical elements that are coupled to the plurality of circular buffers, and where the plurality of circular buffers contains a first copy of instructions comprising a branchless instruction set; a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers.

The system 1300 can include one or more processors 1310 and a memory 1312. The memory 1312 can be used for storing instructions, for storing circuit designs, for storing logic designs, for system support, and the like. The memory can contain data in a data format used for the exchange of layout data of integrated circuits (e.g. information stored in a GDSII, OASIS, or any other suitable format for storing such design structures). The one or more processors 1310 can read in instructions and data 1320, information regarding the circular buffers 1330, and information to be used about memories 1340, and can implement various instruction paging logic designs using an implementation component 1350. The circular buffers 1330 can be represented in the form of digital data stored on a storage medium such as a hard disk. The digital data can be in the form of a library or a database. The library or database can comprise a plurality of standard designs. Similarly, the memories 1340 can be represented in the form of digital data stored on a storage medium such as a hard disk. The circular buffer digital data can also be in the form of a library or database. In at least one embodiment, the implementation component 1350 functions are accomplished by the one or more processors 1310.

In embodiments, a computer system for implementation of a logical calculation apparatus comprises: a memory which stores instructions; one or more processors coupled to the memory wherein the one or more processors are configured to: design a processing architecture comprising: a plurality of circular buffers where the plurality of circular buffers contains instructions for logical elements that are coupled to the plurality of circular buffers, and where the plurality of circular buffers contains a first copy of instructions comprising a branchless instruction set; a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers.

In embodiments, one or more of the instructions and data 1320, the circular buffers 1330, the memories 1340, and the implementation module 1350 are interconnected via the Internet. Cloud computing can be used to design the memories and circular buffers, as well as the interconnecting logic between them. The implementation module 1350 can further include instructions for implementation of the stabilization circuitry used to stabilize logical elements prior to updating the circular buffer contents. Information about the various designs can be shown on a display 1314 which can be attached to the one or more processors 1310. The display 1314 can be any electronic display, including but not limited to, a computer display, a laptop screen, a net-book screen, a tablet screen, a cell phone display, a mobile device display, a remote with a display, a television, a projector, and the like.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for computation comprising:
   paging data stored in a plurality of circular buffers, wherein the plurality of circular buffers controls one or more logical elements of a reconfigurable fabric, and where the paging comprises:
      copying data from a first storage memory into the plurality of circular buffers where:
         each of the plurality of circular buffers is coupled to at least one of the one or more logical elements;
         the data provides instructions for the one or more logical elements;
         as the circular buffers rotate, the instructions that are provided to the one or more logical elements change; and
         the instructions comprise a branchless instruction set.

2. The method of claim 1 wherein instructions from a configuration ROM are used to operate the reconfigurable fabric while the paging is accomplished.

3. The method of claim 1 wherein the paging further comprises copying the data stored in the plurality of circular buffers into a second storage memory.

4. The method of claim 3 further comprising storing state information in the second storage memory.

5. The method of claim 3 wherein the copying, of the data stored in the plurality of circular buffers into a second storage memory, occurs before the copying of the data from a first storage memory into the plurality of circular buffers.

6. The method of claim 3 wherein the first storage memory comprises the second storage memory.

7. The method of claim 3 wherein the first storage memory and the second storage memory are substantially similar.

8. The method of claim 1 wherein the copying of the data from the first storage memory into the plurality of circular buffers causes data previously stored in the plurality of circular buffers to be overwritten.

9. The method of claim 1 wherein the data from the first storage memory includes state information.

10. The method of claim 1 wherein the data from the first storage memory includes instruction information.

11. The method of claim 1 wherein the instructions that change, that are delivered to the logical elements, provide a first sequence of operations by the logical elements.

12. The method of claim 11 wherein the data from the first storage memory provides a second set of instructions to the logical elements.

13. The method of claim 12 wherein the second set of instructions provides a second sequence of operations by the logical elements.

14. The method of claim 1 wherein the plurality of circular buffers comprises circular buffers of differing sizes.

15. The method of claim 14 wherein the circular buffers of differing sizes restart at a same time step.

16. The method of claim 1 wherein the branchless instruction set excludes if statements.

17. The method of claim 1 wherein the branchless instruction set precludes programming loops.

18. The method of claim 1 wherein the branchless instruction set excludes conditional jumps.

19. An apparatus for computation comprising:
    a plurality of circular buffers where the plurality of circular buffers contains instructions for logical elements that are coupled to the plurality of circular buffers, and where the plurality of circular buffers contains a first copy of instructions comprising a branchless instruction set;

a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers.

20. The apparatus of claim 19 further comprising a further storage memory for a third copy of instructions for the plurality of circular buffers where the further storage memory is coupled to the plurality of circular buffers; and a further set of switches and connections for transferring contents of the further storage memory to the plurality of circular buffers.

21. The apparatus of claim 20 wherein the first copy of instructions is copied to a swapping memory before the third copy of instructions is moved into the plurality of circular buffers.

22. A computer program product embodied in a non-transitory computer readable medium for implementation of a logical calculation apparatus comprising:

code for designing a processing architecture including:

a plurality of circular buffers where the plurality of circular buffers contains instructions for logical elements that are coupled to the plurality of circular buffers, and where the plurality of circular buffers contains a first copy of instructions comprising a branchless instruction set;

a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers.

* * * * *